US005758499A

United States Patent [19]

Sugiyama et al.

[11] Patent Number: 5,758,499

[45] Date of Patent: Jun. 2, 1998

[54] HYDRAULIC CONTROL SYSTEM

[75] Inventors: Genroku Sugiyama, Ibaraki-ken; Toichi Hirata, Ushiku-shi, both of Japan

[73] Assignee: Hitachi Construction Machinery Co., Ltd., Tokyo, Japan

[21] Appl. No.: 714,046

[22] PCT Filed: Jan. 3, 1996

[86] PCT No.: PCT/JP96/00498

§ 371 Date: Sep. 5, 1996

§ 102(e) Date: Sep. 5, 1996

[87] PCT Pub. No.: WO96/27741

PCT Pub. Date: Sep. 12, 1996

[30] Foreign Application Priority Data

Mar. 3, 1995 [JP] Japan .................................... 7-044240

[51] Int. Cl.[6] ...................................................... F16D 31/02

[52] U.S. Cl. ................................................ 60/450; 60/452

[58] Field of Search .............................. 60/420, 426, 452, 60/450, 46 R

[56] References Cited

U.S. PATENT DOCUMENTS

| | | | |
|---|---|---|---|
| 5,085,051 | 2/1992 | Hirata | 60/452 X |
| 5,447,027 | 9/1995 | Ishikawa et al. | 60/452 X |
| 5,533,867 | 7/1996 | Strenzke | 60/450 X |
| 5,575,148 | 11/1996 | Hirata et al. | 60/452 X |
| 5,586,869 | 12/1996 | Benckert et al. | 60/452 X |

FOREIGN PATENT DOCUMENTS

| | | |
|---|---|---|
| 3-177604 | 8/1991 | Japan . |
| 5-64506 | 8/1993 | Japan . |
| 6-213205 | 8/1994 | Japan . |

*Primary Examiner*—Hoang Nguyen

*Attorney, Agent, or Firm*—Fay, Sharpe, Beall, Fagan, Minnich & McKee

[57] ABSTRACT

A hydraulic control system is intended to easily hydraulically back up a trouble caused in an electric system, while employing a control unit (13) to utilize the advantage of electric control, when the displacement of a hydraulic pump (1) is controlled in accordance with a status variable of a hydraulic driving system. To this end, a pump regulator (16) is constructed so as to increase the tilting amount θ of a swash plate (1*a*) with a reduction in pressure of a second hydraulic signal Pc. A characteristic of the pump regulator is set such that a negative control pressure Pco can be employed to operate the pump regulator in place of the second hydraulic signal, and characteristics of a fixed throttle (10) and a spring (18*d*) in the pump regulator are set such that the pump regulator can be operated in the working range of the negative control pressure. The control unit (13) sets a modified negative control pressure Pc1 as a target value of the second hydraulic signal and determines a second electric signal E corresponding to the target value in a block (102), so that the working range of the second hydraulic signal generated by the solenoid proportional valve (15) is substantially at the same level as the working range of the negative control pressure.

7 Claims, 22 Drawing Sheets

HYDRAULIC CONTROL SYSTEM

TECHNICAL FIELD

The present invention relates to a hydraulic control system equipped on construction machines such as hydraulic excavators and cranes, and more particularly to a hydraulic control system provided with a pump regulator for controlling the displacement of a hydraulic pump in accordance with a status variable of a hydraulic driving system.

BACKGROUND ART

A known hydraulic control system provided with a pump regulator for controlling the displacement of a hydraulic pump in accordance with a status variable of a hydraulic driving system generally comprises a signal pressure generator for generating, as a first hydraulic signal, a pressure depending on the status variable of the hydraulic driving system, a pressure detector for detecting the first hydraulic signal from the signal pressure generator and converting the detected signal into a first electric signal, a control unit for executing an arithmetic operation based on the first electric signal from the pressure detector and outputting a second electric signal, and a pump regulator driven depending on the second electric signal from the control unit for controlling the displacement of a hydraulic pump. One example of such a hydraulic control system is described in JP, U, 5-64506. In this prior art system, a flow control valve of center bypassing type is used as a flow control valve contained in the hydraulic driving system, a throttle is disposed, as the signal pressure generator, in a center bypass line on the downstream side, and a so-called negative control pressure generated by the throttle is detected as the first hydraulic signal by the pressure detector. Furthermore, a solenoid proportional valve for converting a pilot pressure into a second hydraulic signal depending on the second electric signal is disposed between the control unit and the pump regulator, and the pump regulator is driven by the second hydraulic signal from the solenoid proportional valve.

DISCLOSURE OF THE INVENTION

The foregoing prior art system is advantageous in that such a function as compensating the effect of fluid temperature can be easily added, because the displacement of the hydraulic pump is controlled in accordance with the status variable of the hydraulic driving system in an electric manner by using the control unit. In the electric control using the control unit, however, the process after the step of detecting the first hydraulic signal by the pressure detector to the step of driving the solenoid proportional valve by the second electric signal is all carried out using electric signals. If there occurs any trouble in the electric system such as a contact failure of wires and abnormal operation of the control unit, the pump regulator fails to operate normally any longer, resulting in the problem that the hydraulic pump may always deliver a maximum flow rate to exert an excessive load on a hydraulic circuit, or may always deliver a minimum flow rate to pose a difficulty in working. Such a failed condition cannot be overcome unless the electric system is repaired. Also, as well known, it is generally more difficult to troubleshoot the electric system than the mechanical system.

An object of the present invention is to provide a hydraulic control system which can easily hydraulically back up a trouble caused in an electric system, while employing a control unit to utilize the advantage of electric control, when the displacement of a hydraulic pump is controlled in accordance with a status variable of a hydraulic driving system.

To achieve the above object, the present invention is constructed as follows. In a hydraulic control system comprising a hydraulic driving system including a variable displacement hydraulic pump, a hydraulic actuator driven by a hydraulic fluid delivered from the hydraulic pump, a flow control valve for controlling a flow of the hydraulic fluid supplied from the hydraulic pump to the hydraulic actuator, and manipulation means for operating the flow control valve; first signal pressure generating means for generating, as a first hydraulic signal, a pressure depending on a status variable of the hydraulic driving system; and a pump controller including pressure detecting means for detecting the first hydraulic signal generated by the first signal pressure generating means and converting the detected first hydraulic signal into a first electric signal, a control unit for receiving the first electric signal from the pressure detecting means, executing certain arithmetic operation and outputting a second electric signal, and a pump regulator driven in accordance with the second electric signal from the control unit for controlling the displacement of the hydraulic pump, the pump controller further includes second signal pressure generating means for generating a second hydraulic signal depending on the second electric signal from the control unit and driving the pump regulator by the second hydraulic signal, a characteristic of the pump regulator is set such that the pump regulator can be operated by the first hydraulic signal generated by the first signal pressure generating means, and characteristics of the control unit and the second signal pressure generating means are set such that the working range of the second hydraulic signal generated by the second signal pressure generating means is substantially at the same level as the working range of the first hydraulic signal generated by the first signal pressure generating means.

Preferably, the pump regulator comprises an actuator for operating a displacement varying mechanism of the hydraulic pump and a control switching valve for controlling the operation of the actuator, and the control switching valve comprises a control spool, a pressure receiving sector provided at one end of the control spool for receiving the second hydraulic signal, and biasing means provided at the other end of the control spool opposite to the pressure receiving sector, a characteristic of the biasing means being set such that the control switching valve can be operated by the first hydraulic signal generated by the first signal pressure generating means and the pump regulator can operate the displacement varying mechanism of the hydraulic pump in the working range of the first hydraulic signal.

Preferably, the control unit calculates, based on the first electric signal from the pressure detecting means, a value adapted for making the working range of the second hydraulic signal generated by the second signal pressure generating means substantially at the same level as the working range of the first hydraulic signal generated by the first signal pressure generating means, and determines the second electric signal with the value being as a target value of the second hydraulic signal generated by the second signal pressure generating means, followed by outputting to the second signal pressure generating means.

Preferably, the pump controller further includes an auxiliary line extended from a branching portion between the second signal pressure generating means and the pressure detecting means to a position near the pump regulator for introducing the first hydraulic signal therethrough.

Preferably, the pump controller further includes abnormality detecting means for detecting the occurrence of abnormality in any of the pressure detecting means, the control unit and the second signal pressure generating means, and switching means supplied with the first and second hydraulic signals for selecting the second hydraulic signal to act on the pump regulator when no abnormality is detected by the abnormality detecting means, and selecting the first hydraulic signal to act on the pump regulator when any abnormality is detected by the abnormality detecting means. In this case, the abnormality detecting means includes, e.g., means for detecting a displacement of the hydraulic pump, and means for comparing a target displacement calculated by the control unit with the displacement detected by the detecting means and determining the occurrence of abnormality from the compared result.

Further, the first signal pressure generating means includes, e.g., flow resisting means for generating, as the first hydraulic signal, a negative control pressure depending on a center bypassing flow rate in the hydraulic driving system.

Further, the first signal pressure generating means may include a line for introducing a delivery pressure of the hydraulic pump therethrough and a line for introducing a maximum load pressure in the hydraulic driving system therethrough, and a differential pressure between the delivery pressure of the hydraulic pump and the maximum load pressure in the hydraulic driving system may be detected as the first hydraulic signal through the both lines.

Also preferably, the second signal pressure generating means is a solenoid proportional valve.

In the present invention arranged as set forth above, the control unit is provided to control the pump regulator, a characteristic of the pump regulator is set such that the pump regulator can be operated by the first hydraulic signal generated by the first signal pressure generating means, and characteristics of the control unit and the second signal pressure generating means are set such that the working range of the second hydraulic signal generated by the second signal pressure generating means is substantially at the same level as the working range of the first hydraulic signal generated by the first signal pressure generating means. Therefore, in a normal condition, the pump delivery rate can be electrically controlled through the control unit. In the event of any trouble in the electric system, by introducing the first hydraulic signal generated by the first signal pressure generating means to the pump regulator in place of the second hydraulic signal generated by the second signal pressure generating means, the pump regulator can be operated by the first hydraulic signal in a similar manner as prior to the occurrence of trouble. It is thus possible to easily hydraulically back up the trouble and hence shorten the down time of a machine as compared with the prior art.

With the provision of an auxiliary line extended from a branching portion between the second signal pressure generating means and the pressure detecting means to a position near the pump regulator for introducing the first hydraulic signal therethrough, the first signal pressure can be introduced to the pump regulator in a shorter time by connecting the auxiliary line to the pump regulator in the event of any trouble in the electric system and, therefore, the down time can be further shortened.

With the provision of switching means for selecting the first hydraulic signal to act on the pump regulator when any abnormality is detected by the abnormality detecting means, the first hydraulic signal can be automatically introduced to the pump regulator in the event of any trouble and, therefore, the down time can be even further shortened.

By constructing the first signal pressure generating means so as to include flow resisting means for generating, as the first hydraulic signal, a negative control pressure depending on a center bypassing flow rate in the hydraulic driving system, similar advantages as mentioned above can be achieved when the present invention is applied to a hydraulic driving system which includes a flow control valve of center bypassing type and a pump controller operated under negative control.

By constructing the first signal pressure generating means from a line for introducing a delivery pressure of the hydraulic pump therethrough and a line for introducing a maximum load pressure in the hydraulic driving system therethrough, and by detecting, as the first hydraulic signal, a differential pressure between the delivery pressure of the hydraulic pump and the maximum load pressure in the hydraulic driving system, similar advantages as mentioned above can be achieved when the present invention is applied to a hydraulic circuit which includes a flow control valve of center closed type and a pump controller operated under load sensing control.

BEST MODE FOR CARRYING OUT THE INVENTION

Embodiments of the present invention will be described below with reference to the drawings. To begin with, a first embodiment of the present invention will be described with reference to FIGS. 1 to 10.

Figure 1:
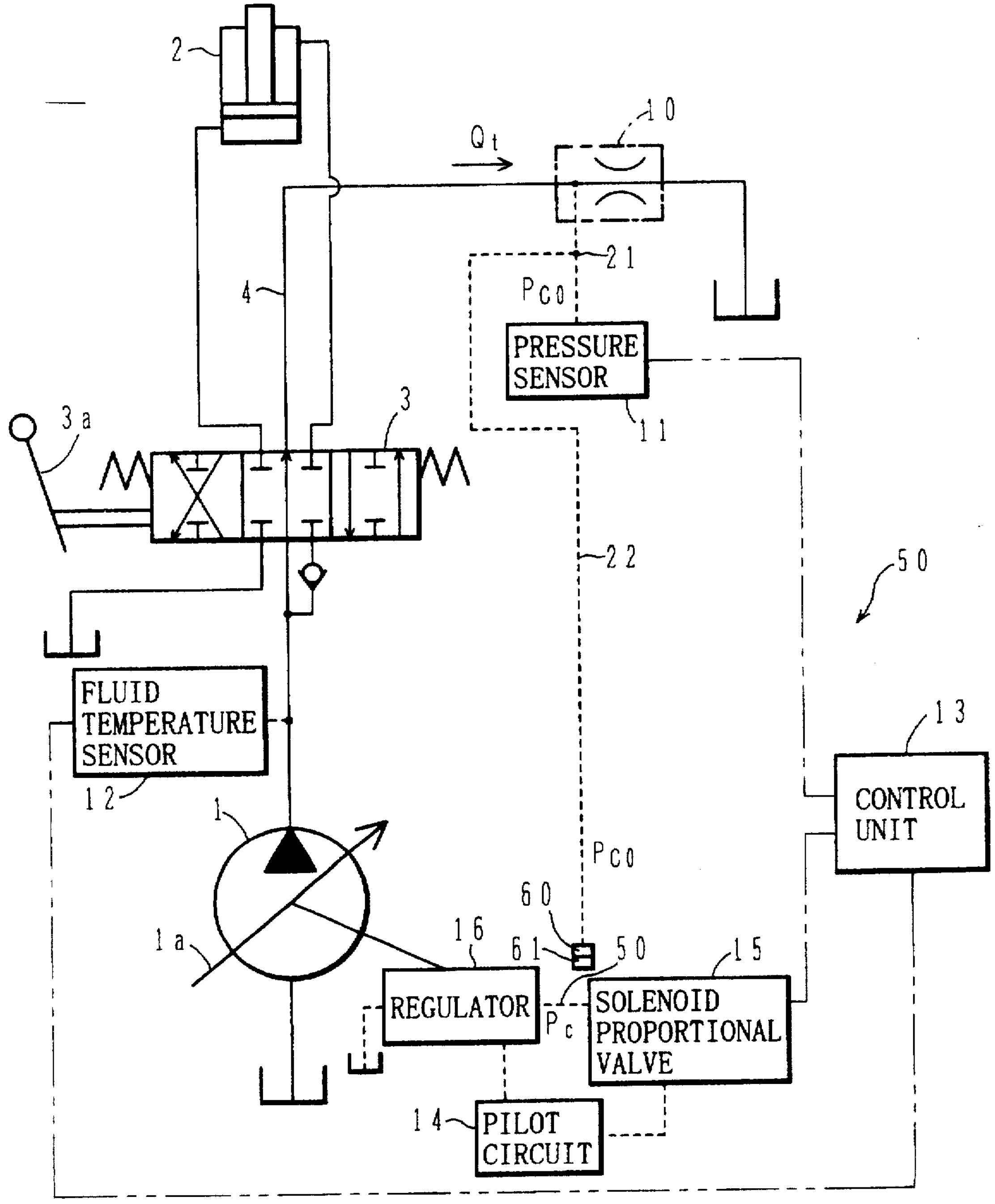
FIG. 1 is a system configuration diagram of a hydraulic control system according to a first embodiment of the present invention.

In FIG. 1, a hydraulic control system according to the first embodiment of the present invention includes a hydraulic driving system comprising a variable displacement hydraulic pump 1 having a displacement varying mechanism (hereinafter represented by a swash plate) 1*a*, a hydraulic actuator, e.g., a hydraulic cylinder 2, driven by a hydraulic fluid delivered from the hydraulic pump 1, a flow control valve 3 of center bypassing type for controlling a flow of the hydraulic fluid supplied from the hydraulic pump 1 to the hydraulic cylinder 2, a center bypass line 4 penetrating the center of the flow control valve 3, and a control lever 3*a* for operating the flow control valve 3. The center bypass line 4 is connected at the upstream side to the hydraulic pump 1 and at the downstream side to a reservoir. The flow control valve 3 is shifted to a position corresponding to the direction and the amount in and by which the control lever 3*a* is operated. Note that the hydraulic control system of this embodiment is equipped on a construction machine, e.g., a hydraulic excavator, and the hydraulic driving system includes a plurality of hydraulic actuators and flow control valves for controlling a plurality of working members. However, FIG. 1 illustrates only one hydraulic actuator and flow control valve for the sake of simplicity.

The hydraulic control system of this embodiment also includes a pump controller 50 comprising a fixed throttle 10 disposed in the center bypass line 4 in the downstream side for generating a negative control pressure Pco as a first hydraulic signal when the hydraulic fluid flowing through the center bypass line 4 at a center bypassing flow rate Qt passes the fixed throttle 10, a pressure sensor 11 for detecting the negative control pressure Pco and converting it into a first electric signal, a fluid temperature sensor 12 for detecting the temperature of the hydraulic fluid in the hydraulic driving system, a control unit 13 for receiving both the first electric signal from the pressure sensor 11 and an electric signal from the fluid temperature sensor 12, executing certain arithmetic operation and outputting a second electric signal, a pilot circuit 14 for generating a pilot pressure, a solenoid proportional valve 15 operated by the second electric signal from the control unit 13 for converting the pilot pressure into a second hydraulic signal Pc depending on the second electric signal, and a pump regulator 16 driven by the second hydraulic signal that is supplied thereto via a line 50 from the solenoid proportional valve 15.

Figure 2:
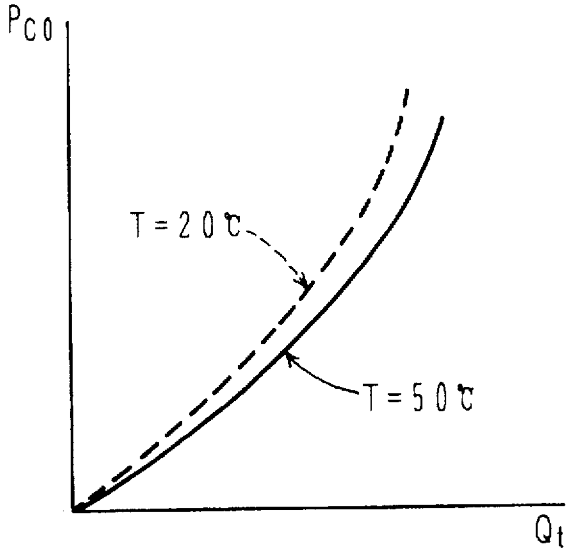
FIG. 2 is a graph showing the relationship between a center bypassing flow rate and a negative control pressure (first hydraulic signal) in the hydraulic control system shown in FIG. 1.
Figure 3:
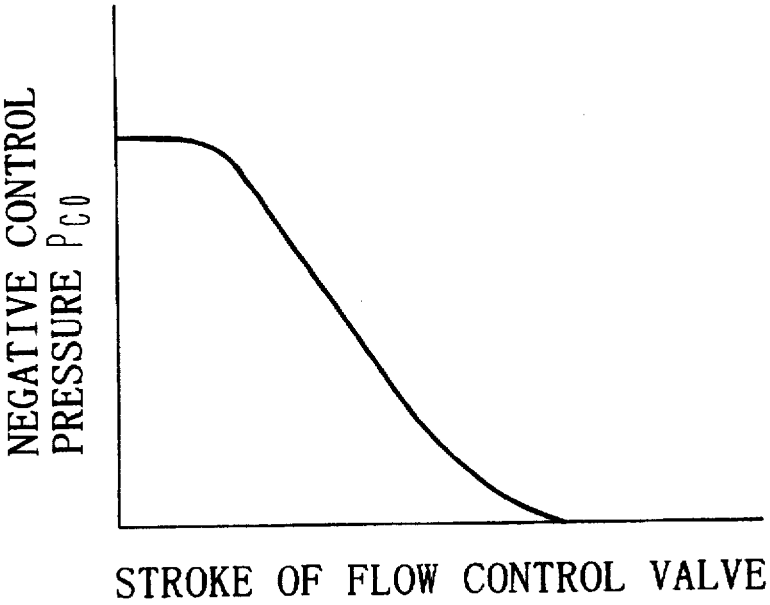
FIG. 3 is a graph showing the relationship between the stroke of a flow control valve and the negative control pressure (first hydraulic signal) in the hydraulic control system shown in FIG. 1.

When the flow control valve 3 is in its neutral position, the passage defining the center bypass line 4 is fully opened and the flow rate Qt passing through the center bypass line 4 is maximized. As the flow control valve 3 is operated by the control lever 3*a* to move farther away from the neutral position, the passage defining the center bypass line 4 is restricted and the center bypassing flow rate Qt is reduced correspondingly. When the flow control valve 3 is in its full stroke position, the passage defining the center bypass line 4 is fully closed and the center bypassing flow rate Qt becomes zero. On the other hand, as shown in FIG. 2, the negative control pressure Pco as the first hydraulic signal that is generated upon the passage of the center bypassing flow rate Qt through the fixed throttle 10 is increased with an increase in the flow rate Qt. As shown in FIG. 3, therefore, the negative control pressure Pco generated by the fixed throttle 10 is maximum when the flow control valve 3 is in the neutral position, lowers as the flow control valve 3 is operated to move farther away from the neutral position, and is minimum when the flow control valve 3 is shifted to the full stroke position. Thus, the negative control pressure Pco is varied depending on the stroke of the flow control valve 3 (demanded flow rate) as a status variable of the hydraulic driving system. The pump controller in this embodiment controls the delivery rate of the hydraulic pump 1 by using the negative control pressure.

In the foregoing pump controller, the fixed throttle 10 has a temperature-dependent throttling characteristic as shown in FIG. 2. Specifically, due to the effect of viscosity, the negative control pressure Pco is increased at lower temperature and is reduced at higher temperature.

Figure 4:
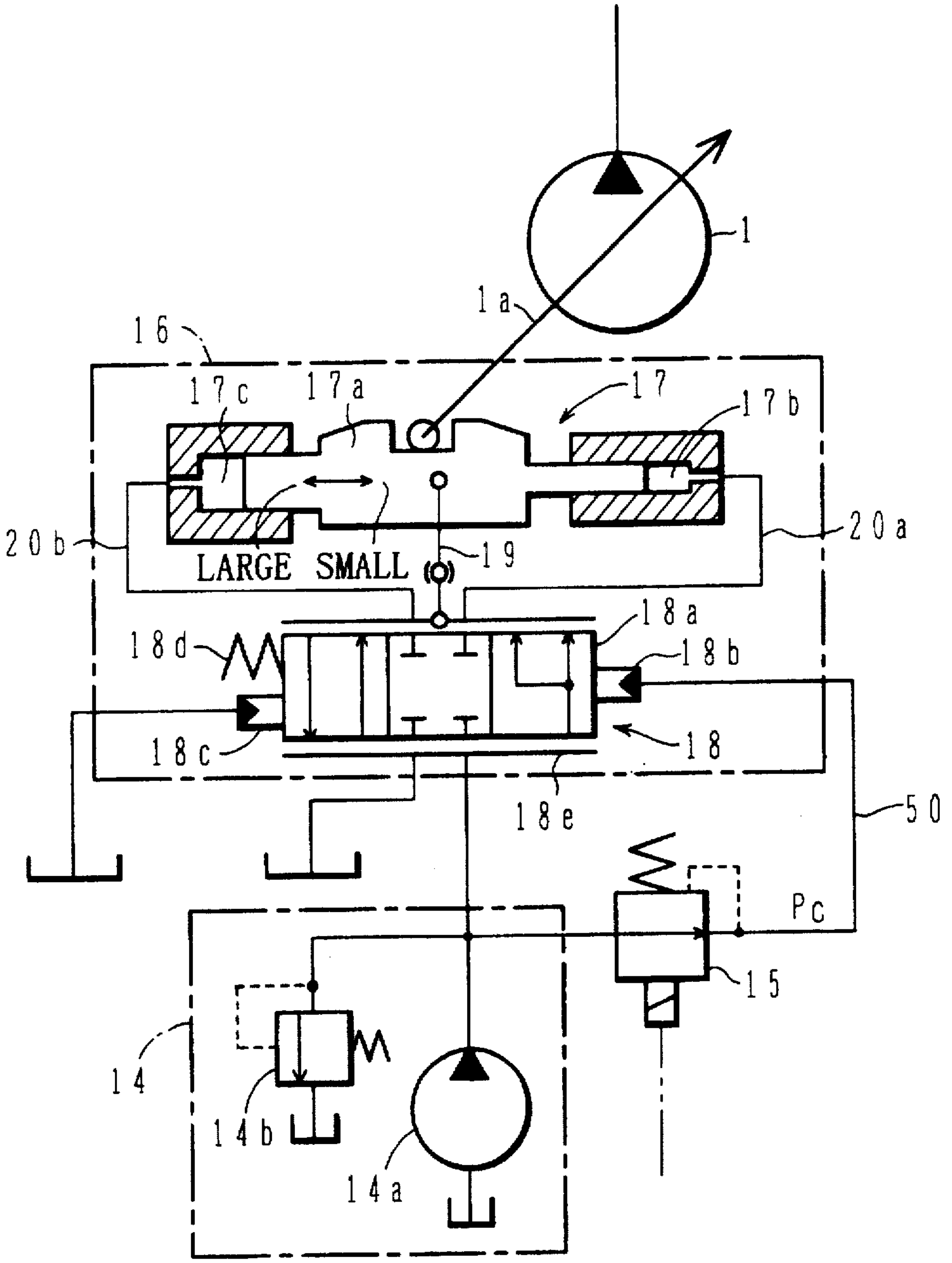
FIG. 4 is a circuit diagram showing details of a pump controller and a pilot circuit in the hydraulic control system shown in FIG. 1.

Further, as shown in FIG. 4, the pump regulator 16 comprises an actuator 17 for operating the swash plate 1*a*, and a control switching valve 18 connected to the actuator 17 through lines 20*a*, 20*b* for controlling the operation of the actuator 17. The actuator 17 is operatively coupled to the swash plate 1*a* and comprises a servo piston 17*a* having opposite ends of different pressure receiving areas, a small-diameter side chamber 17*b* for accommodating the small-diameter side end of the servo piston 17*a*, and a large-diameter side chamber 17*c* for accommodating the large-diameter side end of the servo piston 17*a*. The small-diameter side chamber 17*b* is connected to the line 20*a* and the large-diameter side chamber 17*c* is connected to the line 20*b*. The control switching valve 18 comprises a control spool 18*a*, pressure receiving sectors 18*b*, 18*c* provided at opposite ends of the control spool 18*a*, a spring 18*d* provided at the end of the control spool 18*a* on the same side as the pressure receiving sector 18*c*, and a feedback sleeve 18*e* slidably fitted over an outer circumference of the control spool 18*a*. The second hydraulic signal Pc output from the solenoid proportional valve 15 is introduced to the pressure receiving sector 18*b*, whereas the pressure receiving sector 18*c* is connected to the reservoir. The feedback sleeve 18*e* is connected to the servo piston 17*a* through a link 19 and moved in interlock with the servo piston 17*a*.

The pilot circuit 14 comprises a pilot pump 14*a* and a pilot relief valve 14*b*, and produces a pilot pressure in accordance with setting of the pilot relief valve 13*b*.

Figure 5:
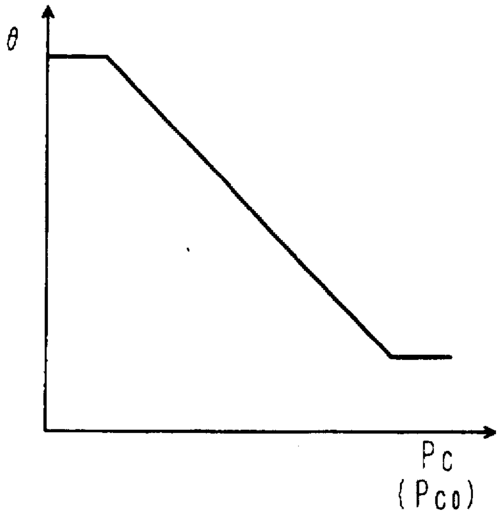
FIG. 5 is a graph showing the relationship between a second hydraulic signal and a pump tilting amount in the pump controller shown in FIG. 4.

FIG. 5 shows a characteristic of the tilting amount θ of the swash plate 1*a* with respect to the second hydraulic signal Pc as resulted when the hydraulic pump 1 is controlled by the pump regulator 16. More specifically, when a certain pressure of the second hydraulic signal Pc is output from the solenoid proportional valve 15, the position of the control spool 18*a* is determined by the balance between the hydraulic force generated in the pressure receiving sector 18*b* upon input of the second hydraulic signal Pc and the biasing force of the spring 18*d* acting in opposition to the hydraulic force. At this time, if the pressure of the second hydraulic signal Pc becomes lower than the preceding pressure, the control spool 18*a* is shifted to the left-hand position, as viewed in FIG. 4, relative to the sleeve 18*e*, whereupon the pilot pressure in the pilot circuit 14 is introduced to the small-diameter side chamber 17*b* through the line 20*a* and the large-diameter side chamber 17*c* is communicated with the reservoir through the line 20*b*. The servo piston 17*a* is thereby moved to the left, as viewed in FIG. 4, in the direction to increase the tilting amount of the swash plate 1*a*. Conversely, if the pressure of the second hydraulic signal Pc becomes higher than the preceding pressure, the control spool 18*a* is shifted to the right-hand position, as viewed in FIG. 4, relative to the sleeve 18*e*, whereupon the same pilot pressure in the pilot circuit 13 is introduced to the small-diameter side chamber 17*b* and the large-diameter side chamber 17*c* through the lines 20*a*, 20*b*, respectively. Due to the difference between the pressure receiving areas of both the chambers, the servo piston 17*a* is moved to the right, as viewed in FIG. 4, in the direction to reduce the tilting amount of the swash plate 1*a*. Further, when the servo piston 17*a* is moved corresponding to the direction in which the control spool 18*a* is deviated from the sleeve 18*e*, the sleeve 18*e* is also moved together by the servo piston 17*a* through the link 19 in the direction to eliminate the deviation. The sleeve 18*e* is then stopped in the position where the control spool 18*a* is balanced and, simultaneously, the tilting amount of the swash plate 1*a* of the hydraulic pump 1 is determined. As a result, the relationship between the second hydraulic signal Pc and the tilting amount θ of the swash plate 1*a* is such that the tilting amount θ of the swash plate 1*a* increases with a reduction in the pressure of the second hydraulic signal Pc, as shown in FIG. 5.

Figure 6:
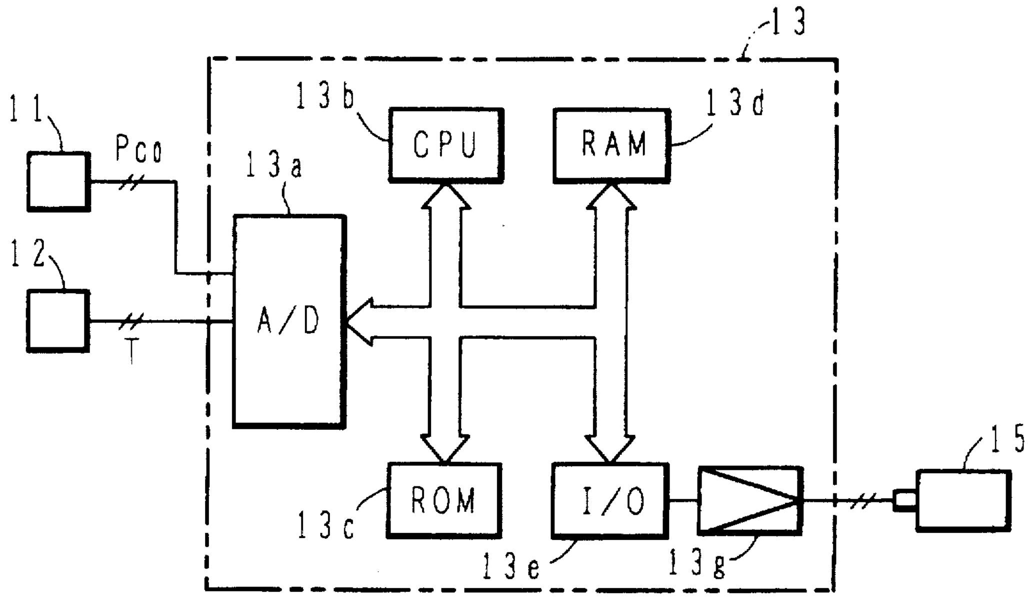
FIG. 6 is a diagram showing the configuration of a control unit in the hydraulic control system shown in FIG. 1.

The control unit 13 is constituted by a microcomputer and comprises, as shown in FIG. 6, an A/D converter 13*a* for receiving the first electric signal output from the pressure sensor 11 and the electric signal output from the fluid temperature sensor 12 and converting these signals into digital signals, a central processing unit (CPU) 13*b*, a read only memory (ROM 13*c*) for storing the program of control steps, a random access memory (RAM) 13*d* for temporarily storing numerical values in the process of arithmetic operation, an I/O interface 13*e* for outputting a signal, and an amplifier 13*g* connected to the solenoid proportional valve 15.

Figure 7:
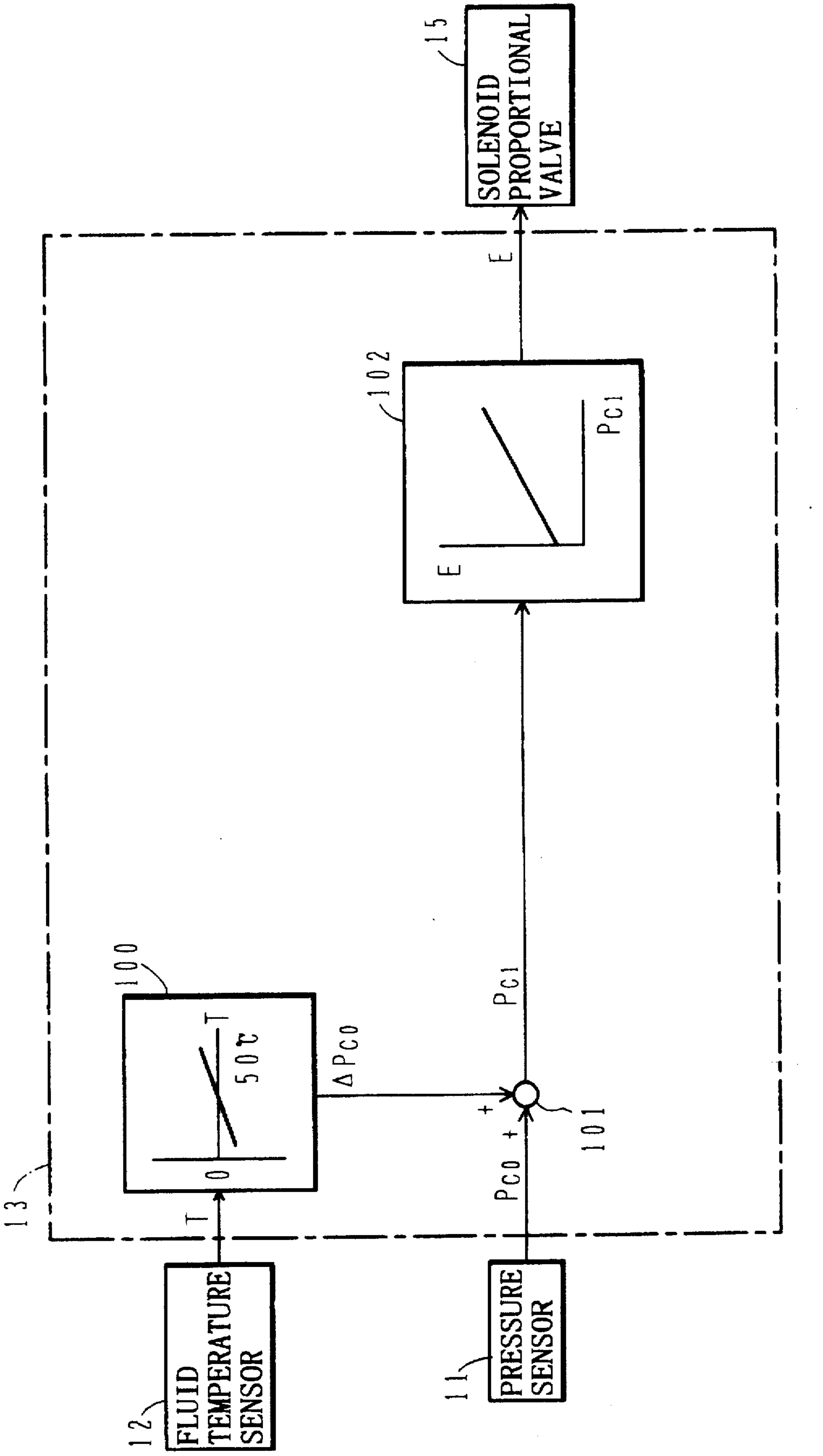
FIG. 7 is a functional block diagram showing the contents of arithmetic operation executed by the control unit in the hydraulic control system shown in FIG. 1.

The processing function carried out by the central processing unit 13*b* of the control unit 13 is shown in a functional block diagram of FIG. 7. Referring to FIG. 7, in a block 100, the central processing unit 13*b* receives the electric signal from the fluid temperature sensor 12 and calculates a compensation value ΔPco of the negative control pressure corresponding to a fluid temperature T by using a temperature compensating table as shown. The temperature compensating table is set such that the compensation value ΔPco is zero when the fluid temperature in the hydraulic driving system is 50° C. as generally occurred during the operation of a hydraulic machine, and is calculated as a negative value in the temperature range lower than 50° C. and as a positive value in the temperature range higher than 50° C. An adder 101 adds the thus-obtained compensation value ΔPco to the negative control pressure Pco represented by the first electric signal from the pressure sensor 11, thereby modifying the negative control pressure depending on temperature. In a block 102, a second electric signal E corresponding to the value Pc1 is determined with the modified negative control pressure Pc1 being as a target value of the second hydraulic signal Pc for the solenoid proportional valve 15, and then output to the solenoid proportional valve 15.

Figure 8:
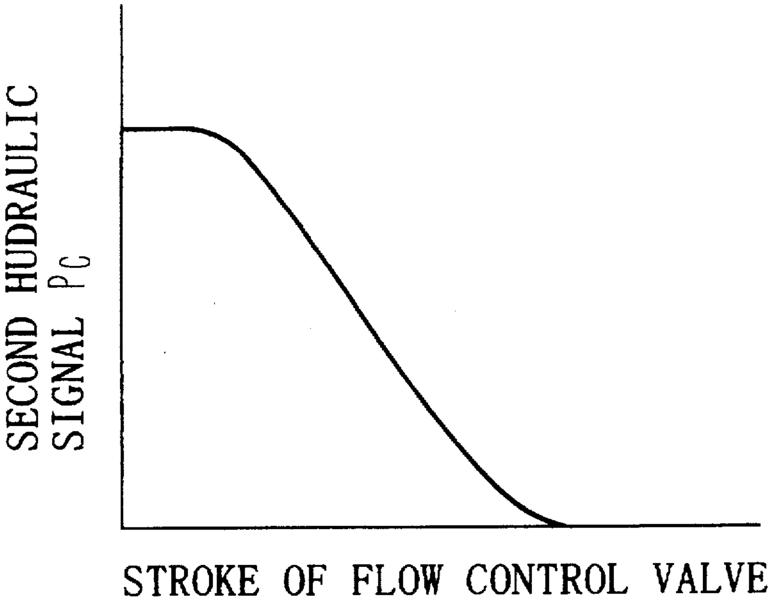
FIG. 8 is a graph showing the relationship between the stroke of the flow control valve and the second hydraulic signal in a solenoid proportional valve shown in FIG. 1.

FIG. 8 shows the relationship between the stroke of the flow control valve 3 and the second hydraulic signal Pc output from the solenoid proportional valve 15 as resulted when the solenoid proportional valve 15 is operated by the second electric signal E. The second hydraulic signal Pc output from the solenoid proportional valve 15 is, as with the characteristic of the fixed throttle 10 shown in FIG. 3, is maximum when the flow control valve 3 is in the neutral position, reduces as the flow control valve 3 is operated to move farther away from the neutral position, and is minimum when the flow control valve 3 is shifted to the full stroke position.

In the above arrangement, a characteristic of the pump regulator 16 is set such that the pump regulator 16 can be operated by the first hydraulic signal generated by the fixed throttle 10, i.e., the negative control pressure Pco, and characteristics of the control unit 13 and the solenoid proportional valve 15 are set such that the working range of the second hydraulic signal Pc generated by the solenoid proportional valve 15 is substantially at the same level as the working range of the negative control pressure Pco generated by the fixed throttle 10.

Specifically, the pump regulator 16 is constructed, as mentioned above, such that the tilting amount θ of the swash plate 1*a* increases with a reduction in the pressure of the second hydraulic signal Pc (see FIG. 5), and the negative control pressure Pco lowers as the flow control valve 3 is operated to move farther away from the neutral position, as shown in FIG. 3. Accordingly, change in the signal input to the pump regulator 16 (i.e., the second hydraulic signal Pc) and change in the negative control pressure Pco correspond to each other when the pump delivery rate is increased and reduced. This means that the structure of the pump regulator 16 permits the negative control pressure Pco to be used in place of the second hydraulic signal Pc, if both pressure levels are adjusted to coincide with each other. First, therefore, a characteristic of the spring 18*d* of the control switching valve 18 in the pump regulator 16 is set such that the control switching valve 18 can be operated with the negative control pressure Pco generated by the fixed throttle 10 and the pump regulator 16 can exhibit the characteristic shown in FIG. 5 in the working range of the negative control pressure Pco when the fluid temperature in the hydraulic driving system is 50° C.

In this embodiment, the characteristics are set below, by way of example. The pilot pressure of the pilot circuit 14 is set to, e.g., 50 $Kg/cm^2$ as conventional. In order that the pump regulator 16 can be operated with the second hydraulic signal Pc generated from the solenoid proportional valve 15 by using such a pilot pressure, a throttling degree (opening area) of the fixed throttle 10 is made gentler (larger) than conventional and is set so as to be able to generate the first hydraulic signal (negative control pressure) Pco having the working range of about 0 to 50 $Kg/cm^2$ depending on the center bypassing flow rate Qt. Also, in the pump regulator 16, a characteristic of the spring 18*d* is set such that the pump regulator 16 can exhibit the characteristic shown in FIG. 5 with the hydraulic signal having the working range of 0 to 50 $Kg/cm^2$.

Next, as stated above, the control unit 13 outputs the second electric signal E corresponding to the value Pc1 in the block 102 with the modified negative control pressure Pc1 being as a target value of the second hydraulic signal Pc for the solenoid proportional valve 15, and the solenoid proportional valve 15 is operated by the second electric signal E. On this occasion, the control unit 13 calculates, as the target value of the second hydraulic signal Pc, a value having the working range substantially at the same level as the first hydraulic signal Pco generated by the fixed throttle 10. Likewise, the solenoid proportional valve 15 generates the second hydraulic signal Pc having the working range substantially at the same level as Pco.

From the practical point of view, in the foregoing example, the solenoid proportional valve 15 generates the second hydraulic signal Pc having the working range of 0 to 50 $Kg/cm^2$ by using the pilot pressure of 50 $Kg/cm^2$.

Incidentally, the fixed throttle 10 may be set as conventional, while a characteristic of the spring 18*d* in the pump regulator 16 and characteristics of the control unit 13 and the solenoid proportional valve 15 may be modified to be adapted for the setting of the fixed throttle 10. In this case, because a pressure level of the second hydraulic signal output from the solenoid proportional valve 15 is required to be matched with the characteristic of the fixed throttle 10, the setting of the pilot circuit 14 is also required to be modified such that the pilot circuit can generate the pilot pressure adapted for the setting of the fixed throttle 10. As an alternative, both the setting of the fixed throttle 10 and the setting of characteristics of the pump regulator, the control unit and the solenoid proportional valve 15 may be modified.

Returning to FIG. 1, a branching portion 21 is provided between the fixed throttle 10 and the pressure sensor 11 and an auxiliary line 22 for introducing the negative control pressure Pco therethrough is extended from the branching portion 21 to a position near the pump regulator 16.

Figure 9:
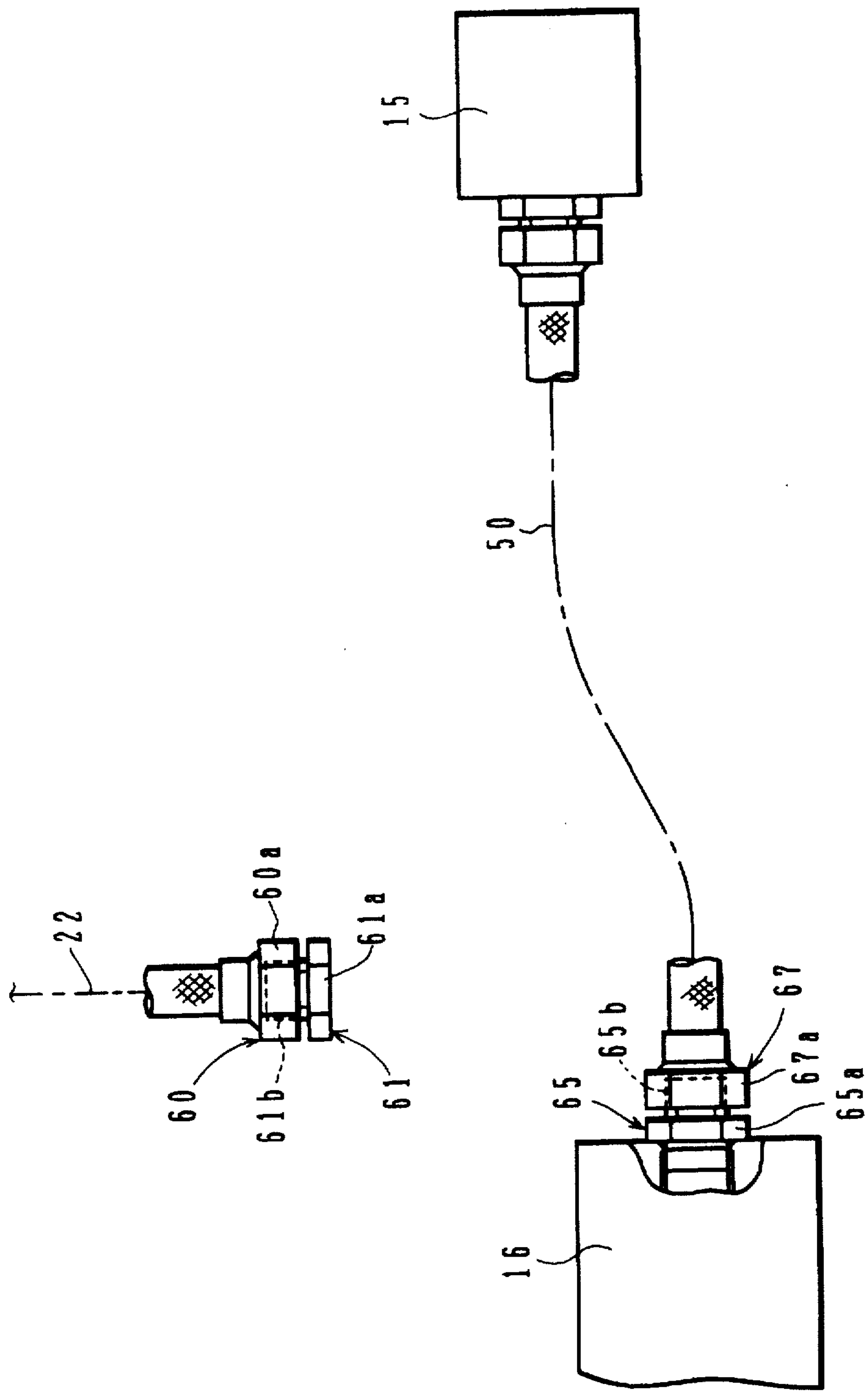
FIG. 9 is a view showing details of an end portion of an auxiliary line and details of line connecting portions between the solenoid proportional valve and a regulator.

FIG. 9 shows details of an end portion of the auxiliary line 22 and details of line connecting portions between the solenoid proportional valve 15 and the regulator 16. A mouthpiece 60 having an opening provided with female threads on the inner side and a nut portion 60*a* on the outer side is attached to the end of the auxiliary line 22. The end of the auxiliary line 22 is closed by screwing a plug 61 into the opening of the mouthpiece 60. The plug 61 has a nut portion 61*a* and an insert portion 61*b* provided with male threads. The plug 61 is screwed to the mouthpiece 60 by inserting the insert portion 61*b* into the opening of the mouthpiece 60 and then turning the nut portion 60*a* or 61*a*.

An adaptor 65 is attached to a connecting portion of the regulator 16 at which the regulator is connected to the line 50. As with the plug 61, the adaptor 65 has a nut portion 65*a* and an insert portion 65*b* provided with male threads. On the other hand, a mouthpiece 67 similar to the mouthpiece 60 is attached to the corresponding end of the line 50. The mouthpiece 67 has an opening provided with female threads on the inner side and a nut portion 67*a* on the outer side. The mouthpiece 67 is screwed to the adaptor 65 by fitting the opening of the mouthpiece 67 to the insert portion 65*b* of the adaptor 65 and then turning the nut portion 67*a*. Connecting portions between the solenoid proportional valve 15 and the line 50 are also constructed in a similar manner.

In this embodiment arranged as described above, as will be seen from the relationships shown in FIGS. 3, 5 and 8, when the flow control valve 3 is in the neutral position and the center bypassing flow rate Qt is large, the displacement of the hydraulic pump 1 is set to be small, and as the flow control valve 3 is operated to move farther away from the neutral position and the center bypassing flow rate Qt is reduced, the displacement of the hydraulic pump 1 is increased. The delivery rate of the hydraulic pump 1 is thus controlled in accordance with the demanded flow rate.

Further, as mentioned above referring to FIG. 2, when the fluid temperature in the hydraulic driving system is lower than 50° C., the negative control pressure Pco is increased and when it is higher than 50° C., the negative control pressure Pco is reduced. Therefore, unless the temperature compensation is performed on the negative control pressure, the delivery rate of the hydraulic pump 1 cannot be controlled precisely. In this embodiment, since the fluid temperature in the hydraulic driving system is detected and the negative control pressure Pco is modified in the control unit 13 depending on temperature as described above, it is possible to compensate the effect of the fluid temperature in the hydraulic driving system and precisely control the delivery rate of the hydraulic pump 1.

Figure 10:
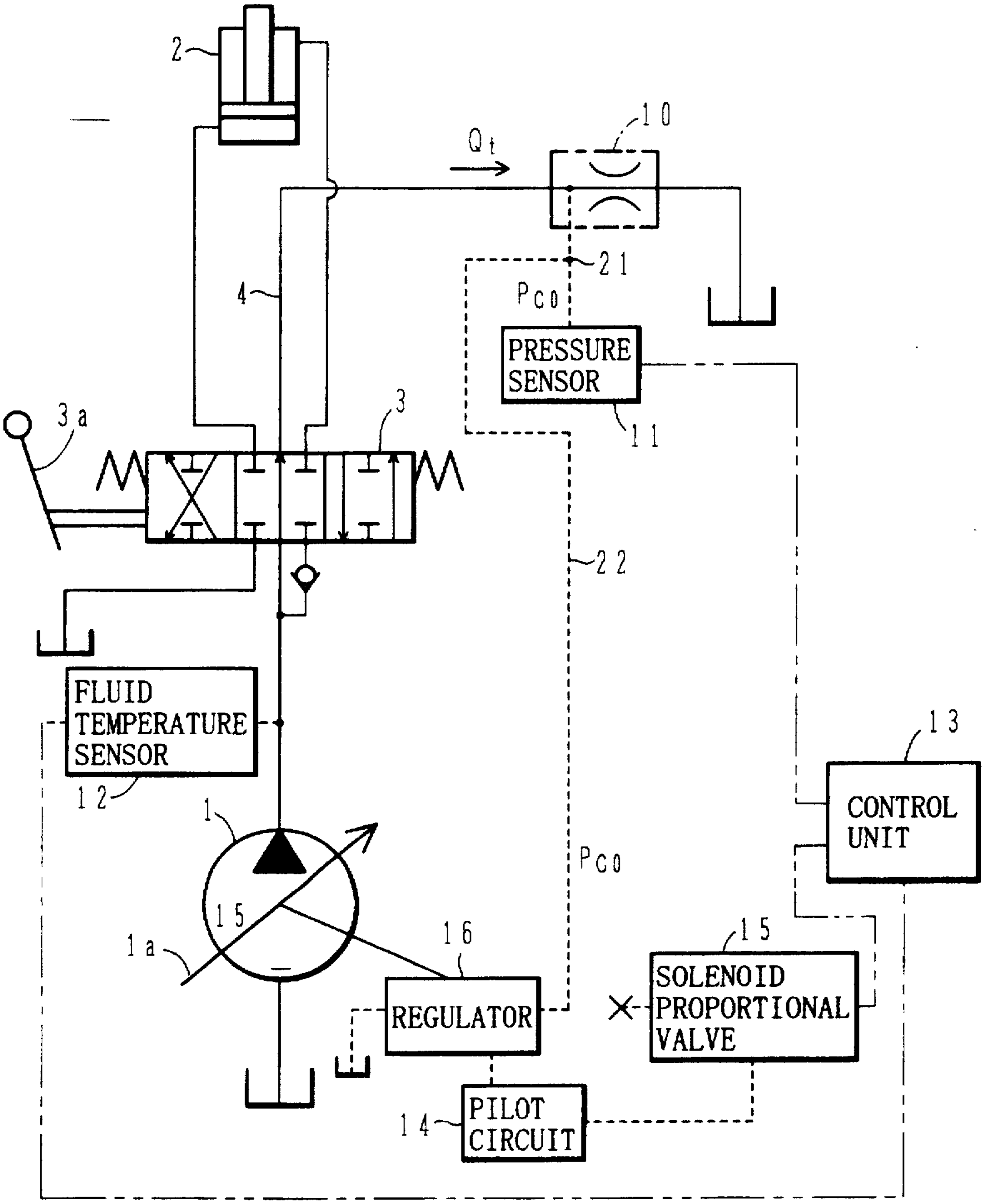
FIG. 10 is a diagram showing a condition where the hydraulic control system shown in FIG. 1 is failed during the operation.
Figure 11:
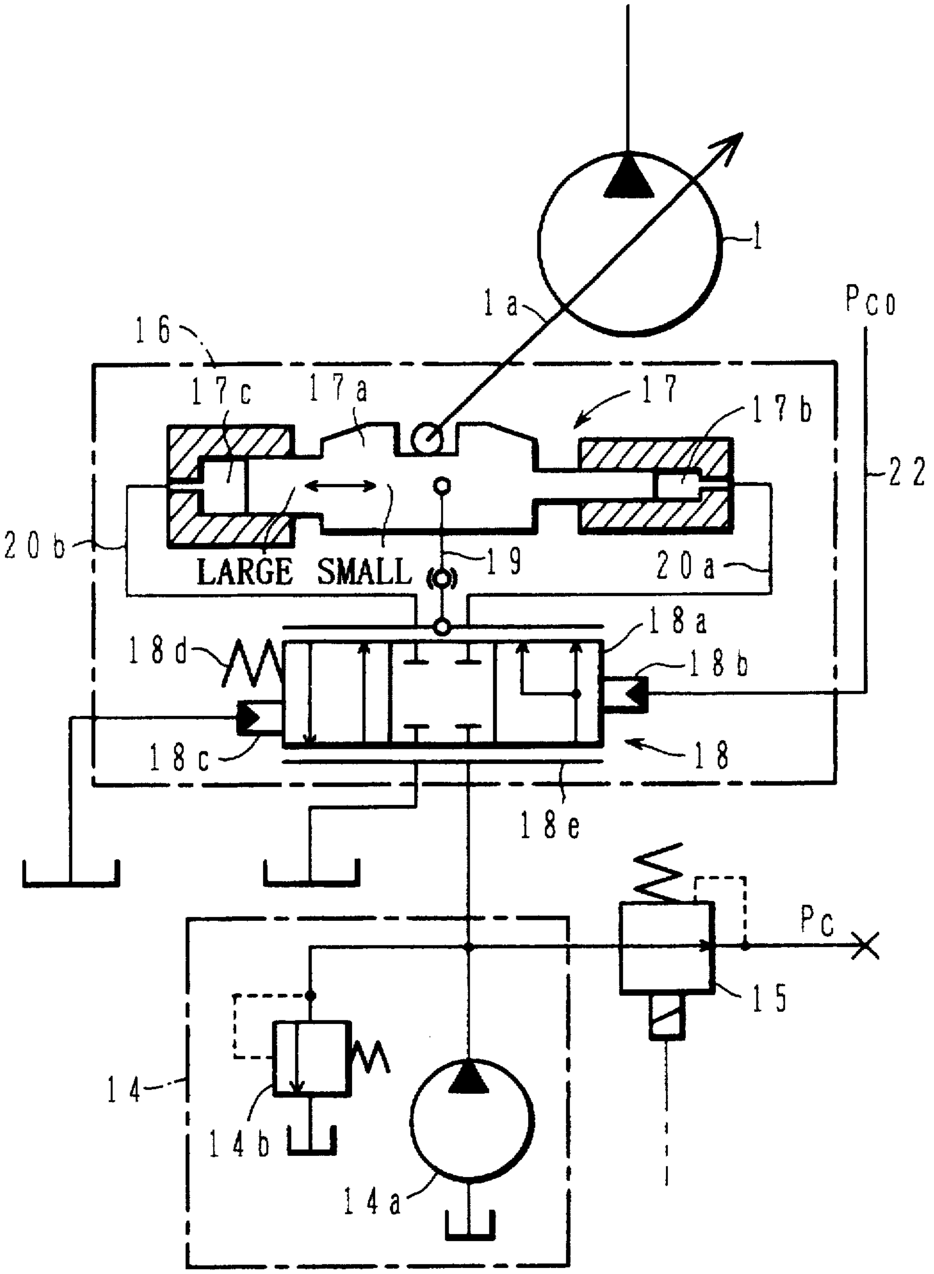
FIG. 11 is a diagram showing a condition where the pump controller shown in FIG. 4 is failed during the operation.

Then, in the event of any trouble in the electric system such as abnormal operation of the pressure sensor 11, the control unit 13 and the solenoid proportional valve 15, or a contact failure of wires, the solenoid proportional valve 14 is disconnected from the control switching valve 18 of the pump regulator 16 and the auxiliary line 22 is connected to the control switching valve 18, as shown in FIGS. 10 and 11, so that the negative control pressure Pco generated by the fixed throttle 10 is directly introduced to the control switching valve 18. With this rearrangement, since a characteristic of the pump regulator 16 and characteristics of the control unit 13 and the solenoid proportional valve 15 are set as described above, the pump regulator 16 can be operated by the negative control pressure Pco in a similar manner as prior to the occurrence of trouble under the fluid temperature condition during general work.

Figure 12:
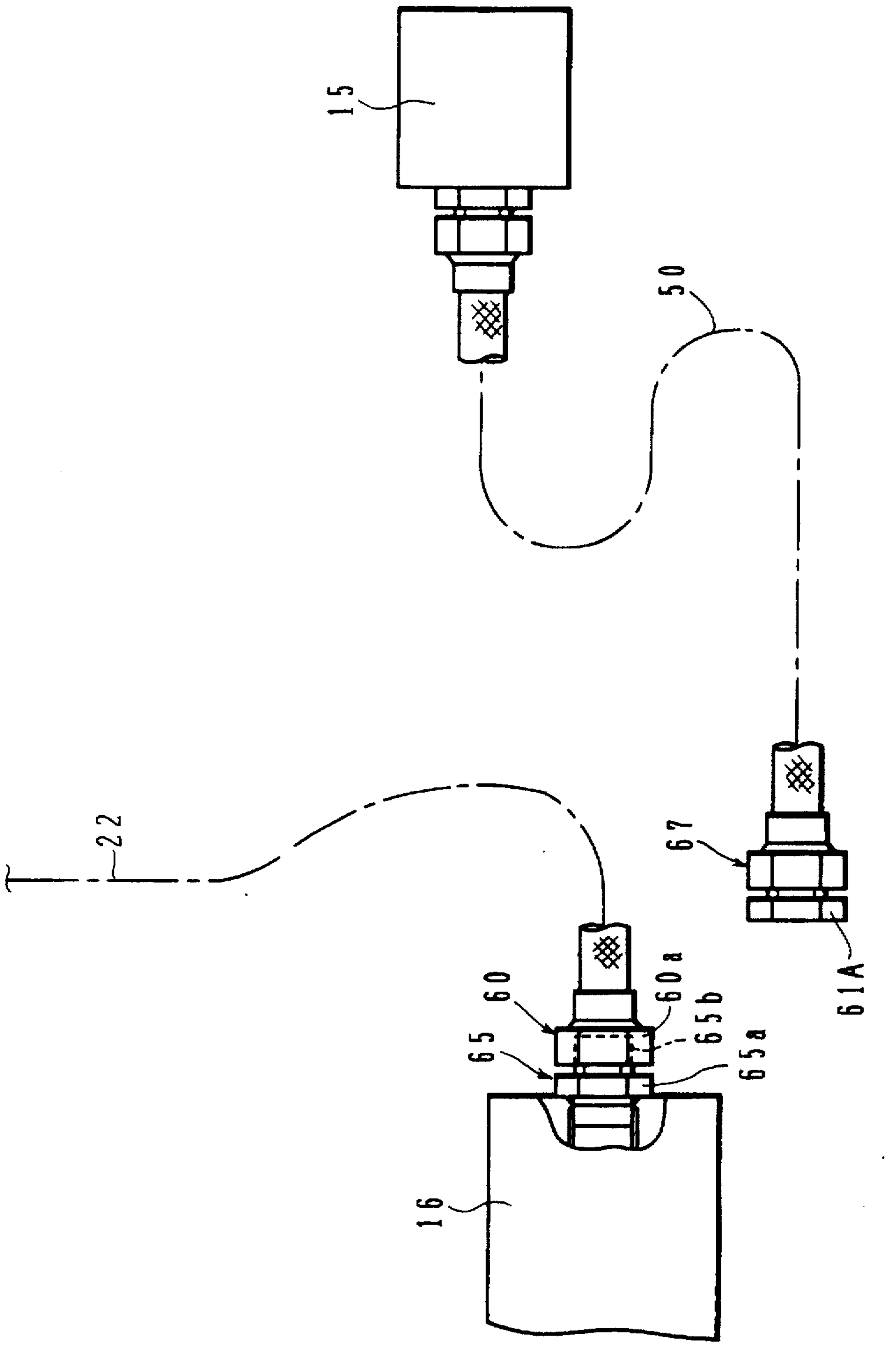
FIG. 12 is a view showing details of connecting portions between the auxiliary line and the regulator.

FIG. 12 shows details of connecting portions between the auxiliary line 22 and the regulator 16. When connecting the auxiliary line 22 to the regulator 16, the plug 61 closing the mouthpiece 60 at the end of the auxiliary line 22 is removed and the mouthpiece 67 of the line 50 is removed from the adaptor 65 of the regulator 16. After that, the mouthpiece 60 of the auxiliary line 22 is connected to the adaptor 65. This connection is made by fitting the opening of the mouthpiece 60 to the insert portion 65*b* of the adaptor 65 arid then turning the nut portion 60*a* so that the mouthpiece 60 is screwed to the adaptor 65. At this time, it is preferable that a plug 61A similar to the plug 61 be inserted and screwed to the mouthpiece 67 of the line 50 to close the opening of the mouthpiece 67.

With this embodiment, as described above, when the displacement of the hydraulic pump is controlled in accordance with a status variable of the hydraulic driving system, it is possible to easily hydraulically back up a trouble caused in the electric system, while employing the control unit to utilize the advantage of electric control, and hence shorten the down time of the machine as compared with the prior art. Further, under the fluid temperature condition during general work, the pump regulator can be operated with similar performance as prior to the occurrence of trouble.

A second embodiment of the present invention will be described with reference to FIGS. 13 to 15. In these figures, similar members and functions as those shown in FIGS. 1, 4 and 7 are denoted by the same reference numerals.

Figure 13:
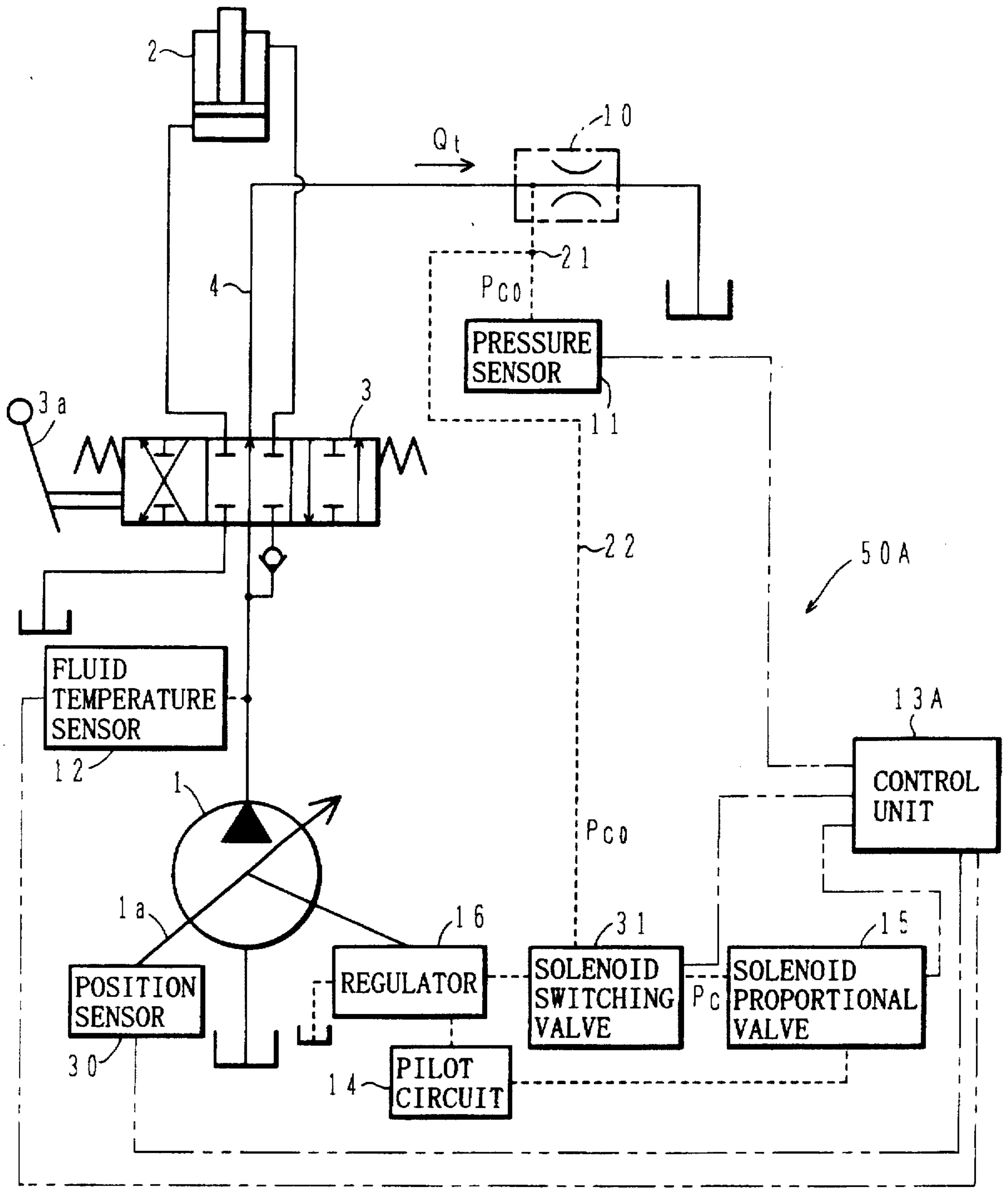
FIG. 13 is a system configuration diagram of a hydraulic control system according to a second embodiment of the present invention.
Figure 14:
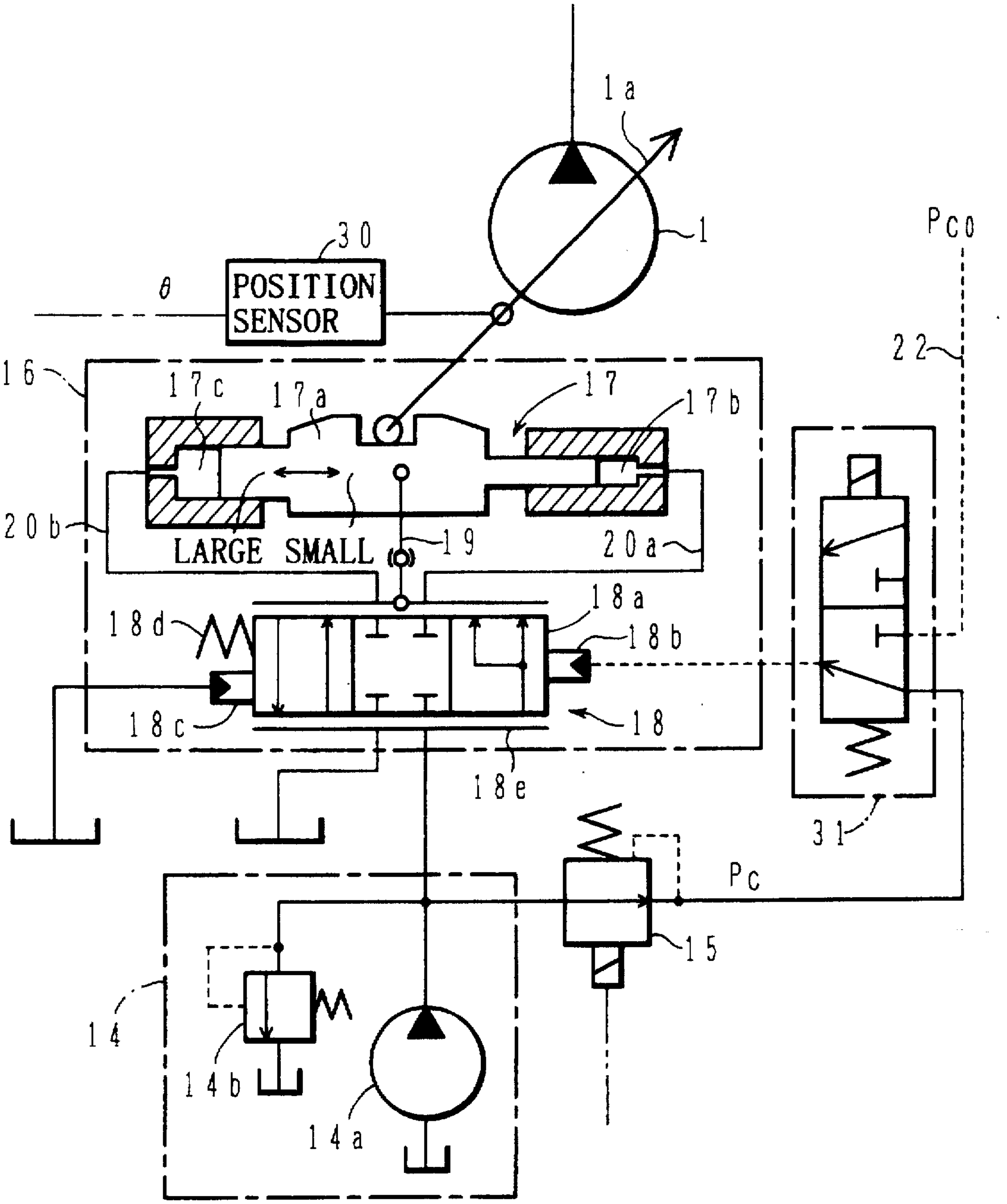
FIG. 14 is a circuit diagram showing details of a pump controller and a pilot circuit in the hydraulic control system shown in FIG. 13.

In a hydraulic control system of this embodiment, as shown in FIGS. 13 and 14, a pump controller 50A further includes, in addition to the arrangement of the first embodiment, a tilting position sensor 30 for detecting the tilting position θ of the swash plate 1*a* of the hydraulic pump 1, and a solenoid proportional valve 31 connected between the solenoid proportional valve 15 as well as the auxiliary line 22 and the pump regulator 16. The solenoid proportional valve 31 is constructed, as shown in FIG. 14, to selectively introduce one of the second hydraulic signal Pc from the solenoid proportional valve 15 and the first hydraulic signal Pco generated by the fixed throttle 10 and introduced through the auxiliary line 22 to the pressure receiving sector 18*b* of the control switching valve 18 in the pump regulator 16.

Figure 15:
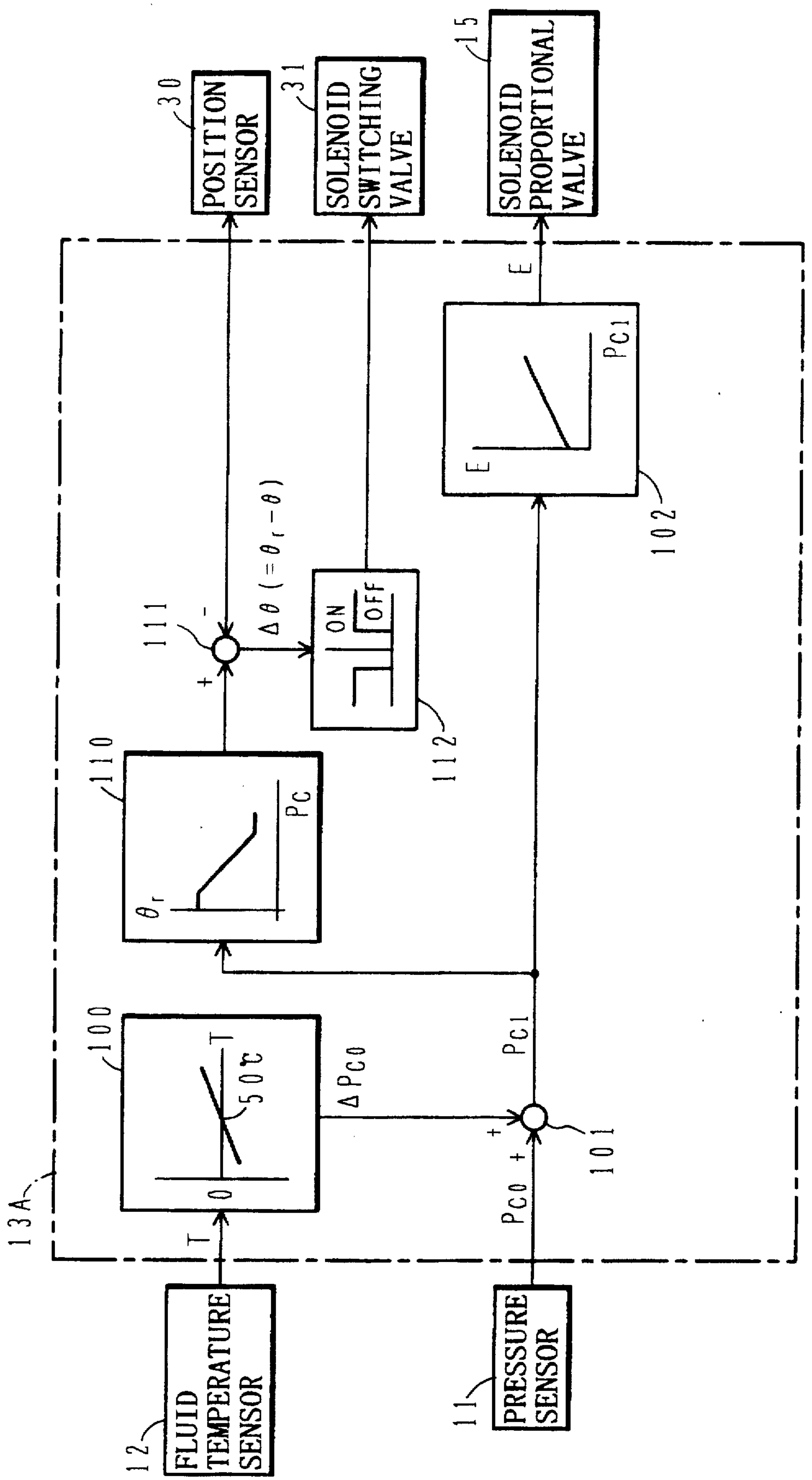
FIG. 15 is a functional block diagram showing the contents of arithmetic operation executed by a control unit in the hydraulic control system shown in FIG. 13.

As shown in FIG. 15, the control unit 13A calculates, in a block 110, a target pump tilting θr corresponding to the negative control pressure Pc1 modified depending on temperature and, in a subtracter 111, determines a difference Δθ (θr−θ) between the target tilting position θr and the actual tilting position θ based on an electric signal from the tilting position sensor 30. Then, in a block 112, the control unit 13A judges the electric system to be normal and does not output a shift signal to the solenoid proportional valve 31 when the difference Δθ is within a preset range of value, and judges the electric system to be abnormal and outputs a shift signal to the solenoid proportional valve 31 when the difference Δθ is larger than a preset value. When no shift signal is output, the solenoid proportional valve 31 is held in its position as shown to introduce the second hydraulic signal Pc from the solenoid proportional valve to the control switching valve 18. When a shift signal is output from the control unit 13A, the solenoid proportional valve 14 is shifted from the illustrated position to directly introduce the negative control pressure Pco generated by the fixed throttle 10 to the control switching valve 18.

In this embodiment arranged as described above, if the electric system is failed, the negative control pressure Pco is automatically introduced to the pump regulator 16 and, therefore, the down time can be further shortened.

A third embodiment of the present invention will be described with reference to FIGS. 16 to 25. In these figures, similar members as those shown in FIGS. 1, 4, 6, 9 and 11 are denoted by the same reference numerals. In this embodiment, the present invention is applied to a hydraulic controller having a hydraulic driving system with a function of load sensing control.

Figure 16:
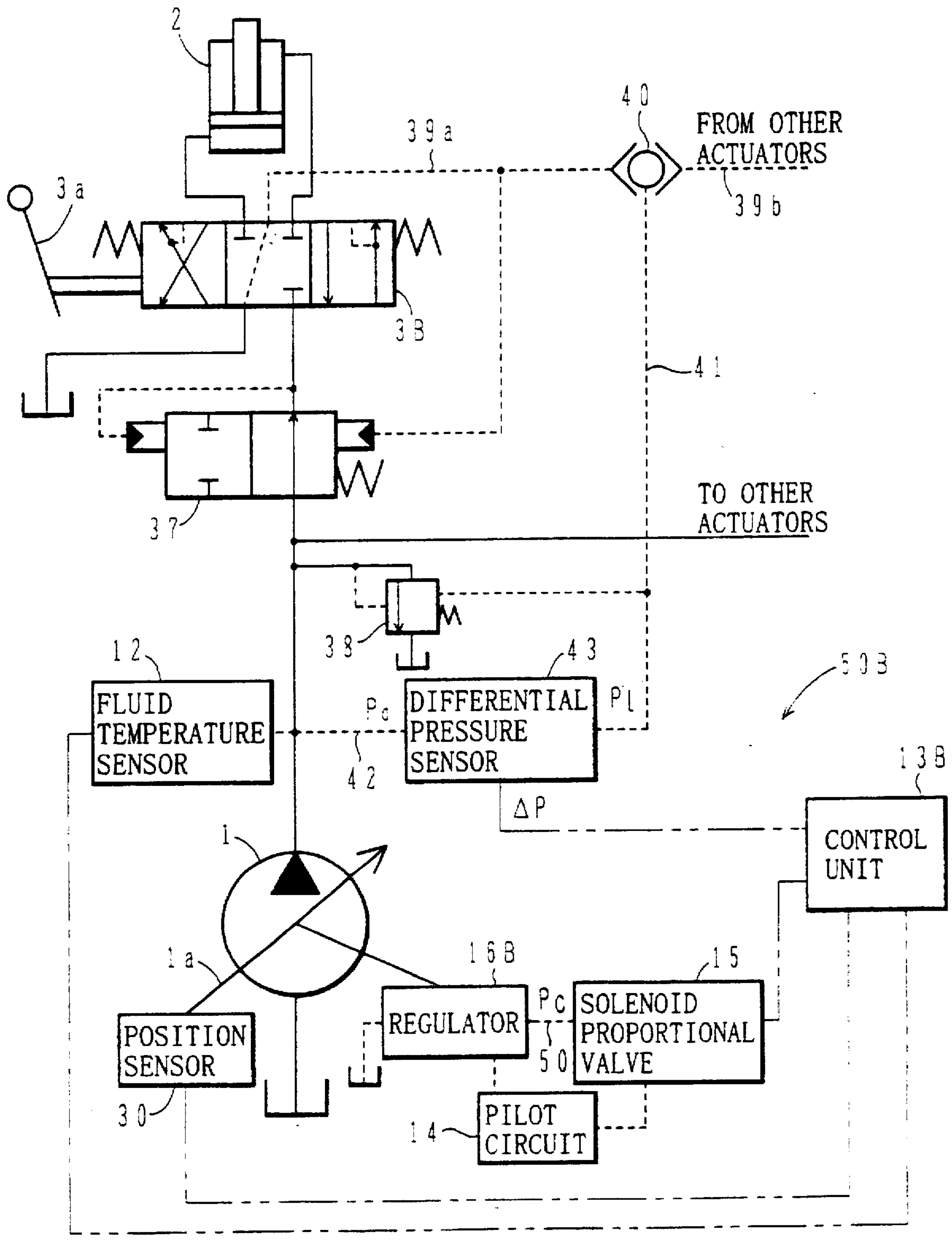
FIG. 16 is a system configuration diagram of a hydraulic control system according to a third embodiment of the present invention.

Referring to FIG. 16, a hydraulic control system of this embodiment includes a hydraulic driving system comprising a variable displacement hydraulic pump 1, a hydraulic cylinder 2, a flow control valve 3B of closed center type for controlling a flow of the hydraulic fluid supplied from the hydraulic pump 1 to the hydraulic cylinder 2, a pressure compensating valve 37 disposed between the hydraulic pump 1 and the flow control valve 3B for ensuring a differential pressure across the flow control valve 3B, an unloading valve 38 for limiting a differential pressure between a delivery pressure Pd of the hydraulic pump 1 and a maximum load pressure P1 within a predetermined value (maximum differential pressure) ΔPmax, and a control lever 3*a* for operating the flow control valve 3B. Connected to the hydraulic driving system are one or plural other hydraulic actuators (not shown), as well as one or plural corresponding flow control valves and pressure compensating valves.

The hydraulic control system of this embodiment also includes a pump controller 50B comprising a line 39*a* for introducing a load pressure of the hydraulic cylinder 2 therethrough, a shuttle valve 40 connected to the line 39*a* and similar lines associated with the other actuators for selecting the maximum load pressure P1 of the hydraulic driving system, a line 41 for introducing the maximum load pressure P1 selected by the shuttle valve 40 therethrough and a line 42 for introducing the delivery pressure Pd of the hydraulic pump 1 therethrough, a differential pressure sensor 43 for detecting, as a first hydraulic signal, a differential pressure ΔP between the maximum load pressure introduced through the line 41 and the pump delivery pressure introduced through the line 42 and converting the first hydraulic signal into a first electric signal, a fluid temperature sensor 12 for detecting the fluid temperature in the hydraulic driving system and converting the detected temperature into a second electric signal, a tilting position sensor 30 for detecting the tilting position θ of a swash plate 1*a* of the hydraulic pump 1, a control unit 13B for receiving the first electric signal from the differential pressure sensor 43 and electric signals from the fluid temperature sensor 12 and the tilting position sensor 30, executing certain arithmetic operation and outputting a second electric signal, a pilot circuit 14 for generating a pilot pressure for control, a solenoid proportional valve 15 operated by the second electric signal from the control unit 13B for converting the pilot pressure into a second hydraulic signal Pc depending on the second electric signal, and a pump regulator 16B driven by the second hydraulic signal from the solenoid proportional valve 15.

When the flow control valve 3B is in its neutral position and closed, a reservoir pressure is introduced to the line 39*a*. Assuming that any other actuators are not driven, the maximum load pressure selected by the shuttle valve 41 is also equal to the reservoir pressure and the differential pressure ΔP between the delivery pressure of the hydraulic pump 1 and the maximum load pressure is maximized. When the flow control valve 3B is operated, a hydraulic fluid is supplied to the hydraulic cylinder 2 at a flow rate depending on the stroke of the flow control valve 3B (demanded flow rate). If the delivery rate of the hydraulic pump 1 is smaller than the demanded flow rate, the delivery pressure of the hydraulic pump 1 lowers and the differential pressure ΔP reduces. On the other hand, if the pump delivery rate becomes larger than the demanded flow rate with an increase in the delivery pressure of the hydraulic pump 1, the delivery pressure of the hydraulic pump 1 rises and the differential pressure ΔP increases. Thus, the differential pressure ΔP between the maximum load pressure and the pump delivery pressure is varied depending on the stroke of the flow control valve 3B as a status variable of the hydraulic driving system. The pump controller in this embodiment controls the delivery rate of the hydraulic pump 1 by using the differential pressure ΔP. Here, the line 41 and the line 42 constitute first signal pressure generating means for generating, as the first hydraulic signal, a pressure (differential pressure) depending on a status variable of the hydraulic driving system.

Figure 17:
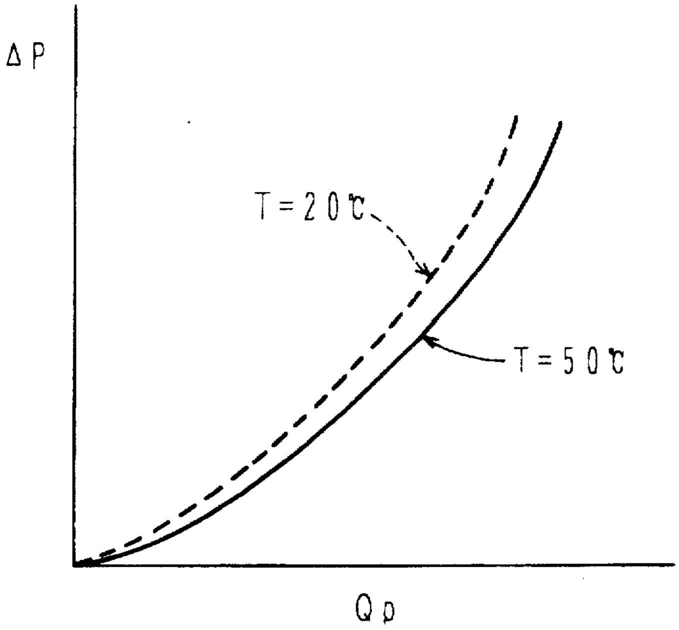
FIG. 17 is a graph showing the relationship between a pump delivery rate and a differential pressure (first hydraulic signal) in the hydraulic control system shown in FIG. 16.

In the foregoing pump controller, a temperature characteristic resulted when controlling the delivery rate Qp of the hydraulic pump 1 with the differential pressure ΔP is as shown in FIG. 17. Specifically, due to the effect of viscosity, the differential pressure ΔP is increased with respect to the same delivery rate Qp of the hydraulic pump at lower temperature and is reduced at higher temperature.

Figure 18:
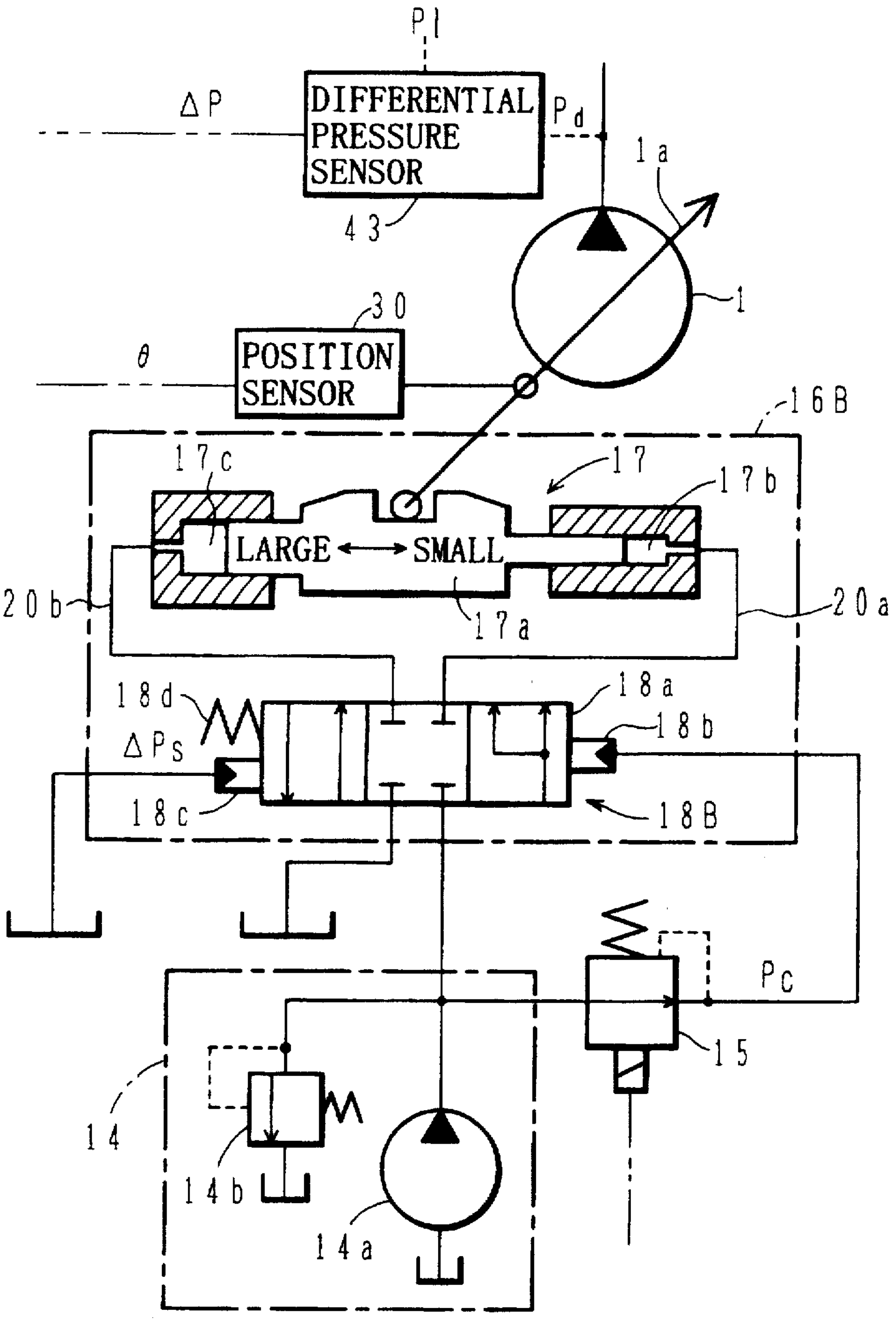
FIG. 18 is a circuit diagram showing details of a pump controller and a pilot circuit in the hydraulic control system shown in FIG. 16.

Further, as shown in FIG. 18, the pump regulator 16B comprises an actuator 17 for operating the swash plate 1a, and a control switching valve 18B connected to the actuator 17 through lines 20a, 20b for controlling the operation of the actuator 17. The actuator 17 has the same construction as that in the first embodiment. The control switching valve 18B comprises a control spool 18a, pressure receiving sectors 18b, 18c provided at opposite ends of the control spool 18a, and a spring 18d provided at the end of the control spool 18a on the same side as the pressure receiving sector 18c for setting a characteristic of the pump regulator 16B. The second hydraulic signal Pc output from the solenoid proportional valve 15 is introduced to the pressure receiving sector 18b, whereas the pressure receiving sector 18c is connected to the reservoir.

Figure 19:
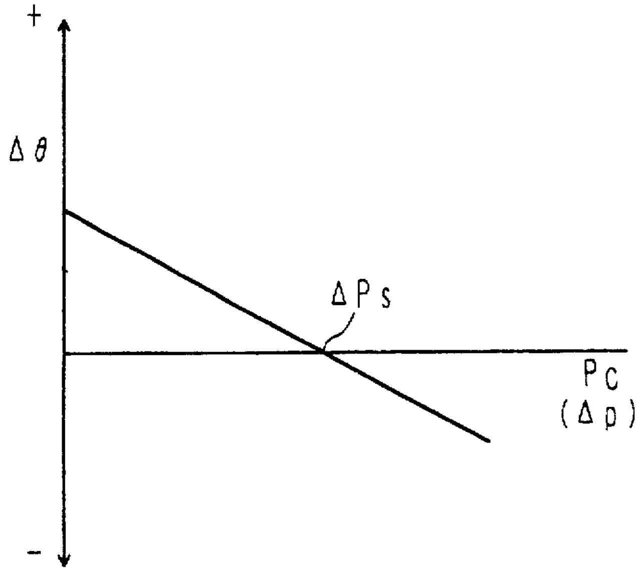
FIG. 19 is a graph showing the relationship between a second hydraulic signal and an increment of the pump tilting amount in the pump controller shown in FIG. 18.

FIG. 19 shows a characteristic of an increment Δθ of the tilting amount θ of the swash plate 1a with respect to the second hydraulic signal Pc as resulted when the hydraulic pump 1 is controlled by the pump regulator 16B. More specifically, when a certain pressure of the second hydraulic signal Pc is output from the solenoid proportional valve 15 and this pressure of the second hydraulic signal Pc is smaller than a set value ΔPs of the spring 18d, the control spool 18a is shifted to the left-hand position, as viewed in FIG. 18, whereupon the pilot pressure in the pilot circuit 13 is introduced to the small-diameter side chamber 17b through the line 20a and the large-diameter side chamber 17c is communicated with the reservoir through the line 20b. The servo piston 17a is thereby moved to the left, as viewed in FIG. 18, in the direction to increase the tilting amount of the swash plate 1a. Conversely, if the pressure of the second hydraulic signal Pc is higher than the set value ΔPs of the spring 18d, the control spool 18a is shifted to the right-hand position, as viewed in FIG. 18, whereupon the same pilot pressure in the pilot circuit 14 is introduced to the small-diameter side chamber 17b and the large-diameter side chamber 17c through the lines 20a, 20b, respectively. Due to the difference between the pressure receiving areas of both the chambers, the servo piston 17a is moved to the right, as viewed in FIG. 18, in the direction to reduce the tilting amount of the swash plate 1a. When the pressure of the second hydraulic signal Pc is equal to the set value ΔPs of the spring 18d, the control spool 18a remains in the illustrated position so that the servo piston 17a is kept in the illustrated position to hold the tilting amount of the swash plate 1a at that time. As a result, the relationship between the second hydraulic signal Pc and the increment Δθ of the tilting amount θ of the swash plate 1a is such that with the set value ΔPs of the spring 18d being a boundary, the increment Δθ is increased in the positive direction as the pressure of the second hydraulic signal Pc becomes smaller than the set value ΔPs of the spring 18d, and is reduced in the negative direction as the pressure of the second hydraulic signal Pc becomes larger than the set value ΔPs of the spring 18d, as shown in FIG. 19.

Figure 20:
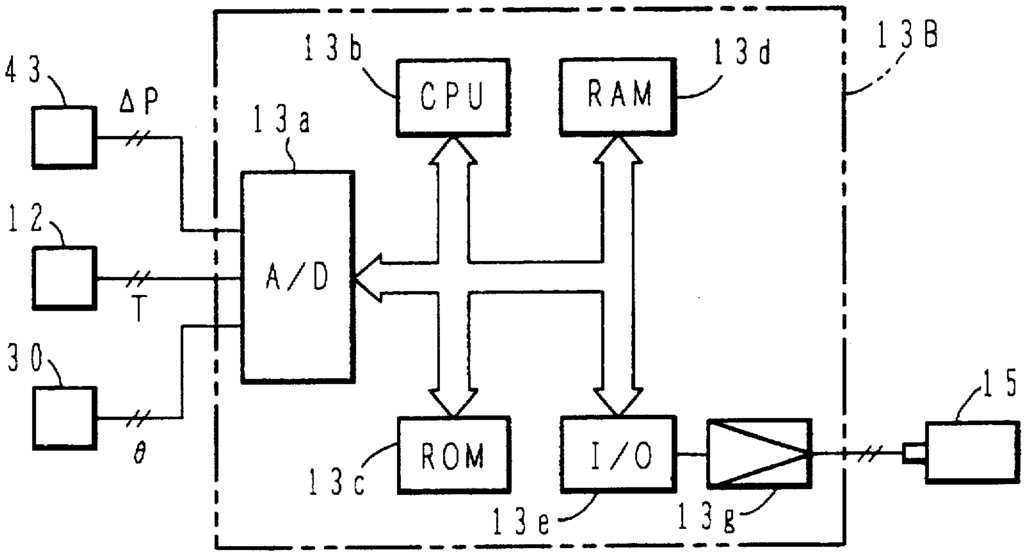
FIG. 20 is a diagram showing the configuration of a control unit in the hydraulic control system shown in FIG. 16.

The control unit 13B is constituted by a microcomputer and comprises, as shown in FIG. 20, an A/D converter 13a for receiving the first electric signal output from the differential pressure sensor 43 and the electric signals output from the fluid temperature sensor 12 and the tilting position sensor 30, and converting these signals into digital signals, a central processing unit (CPU) 13b, a read only memory (ROM 13c) for storing the program of control steps, a random access memory (RAM) 13d for temporarily storing numerical values in the process of arithmetic operation, an I/O interface 13e for outputting a signal, and an amplifier 13g connected to the solenoid proportional valve 15.

Figure 21:
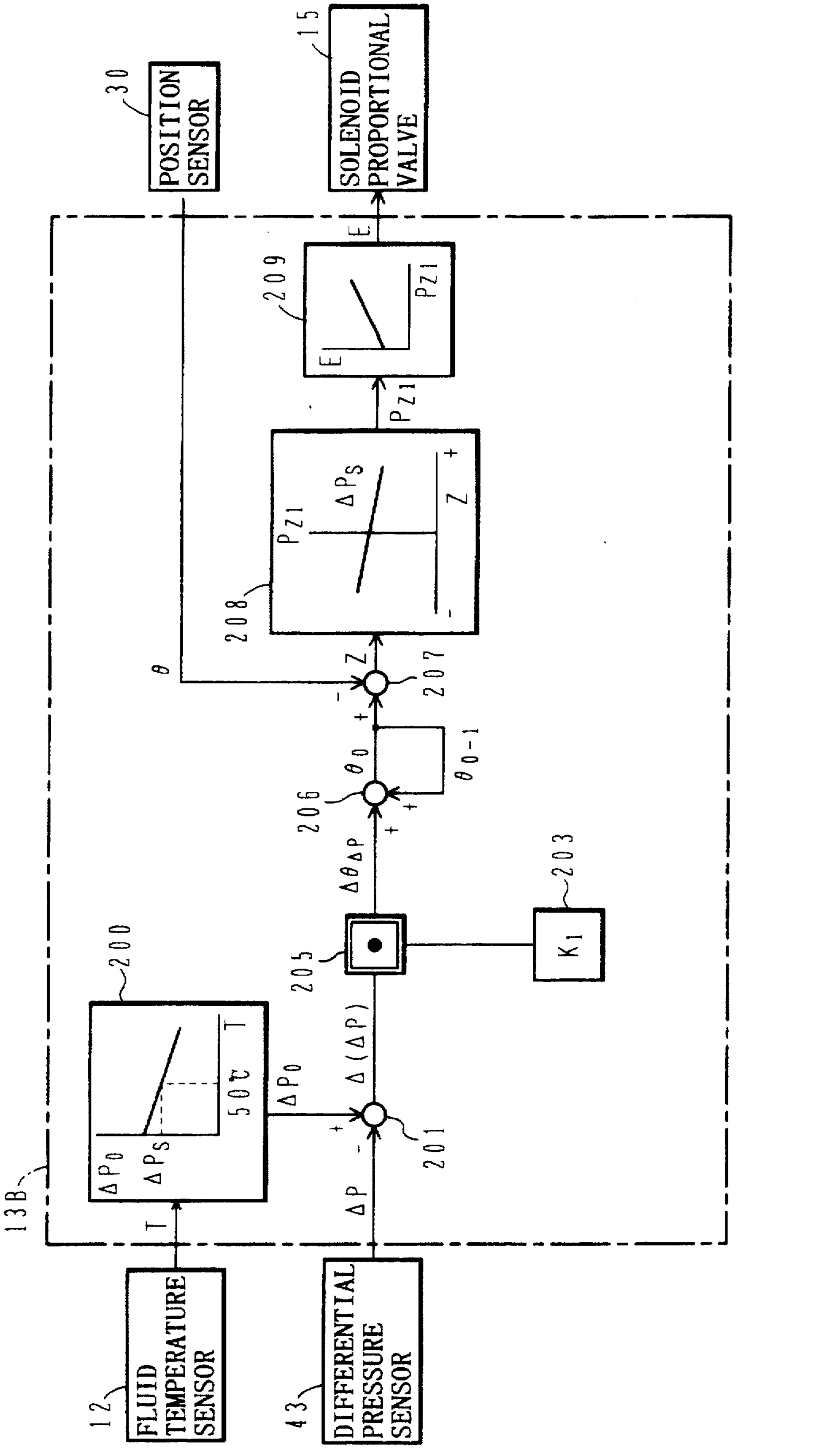
FIG. 21 is a functional block diagram showing the contents of arithmetic operation executed by the control unit in the hydraulic control system shown in FIG. 16.

The processing function carried out by the central processing unit 13b of the control unit 13b is shown in a functional block diagram of FIG. 21. Referring to FIG. 21, in a block 200, the central processing unit 13b receives the electric signal from the fluid temperature sensor 12 and calculates a target differential pressure ΔPo corresponding to a fluid temperature T by using a temperature compensating table as shown. The temperature compensating table is set such that the target differential pressure ΔPo is coincident with the set value ΔPs of the spring 18d in the pump regulator 16B when the fluid temperature in the hydraulic driving system is 50° C. as generally occurred during the operation of a hydraulic machine, and is calculated to be larger than ΔPs in the temperature range lower than 50° C. and to be smaller than ΔPs in the temperature range higher than 50° C. In a subtracter 201, the differential pressure ΔP represented by the first electric signal from the differential pressure sensor 43 is subtracted from the target differential pressure ΔPo obtained in the block 200 to determine a differential pressure deviation Δ(ΔP). Further, in a block 205 and an adder 206, a target tilting position θo of the hydraulic pump 1 is calculated through integral control. A subtracter 207 then compares the target tilting position θo and the actual tilting position θ detected by the tilting position sensor 30 to determine a deviation Z therebetween. In a block 208, a target value Pz1 of the second hydraulic signal Pc for the solenoid proportional valve 15 corresponding to the deviation Z is determined by using a table as shown. A second electric signal E corresponding to the target value Pc1 is determined in a block 209 and then output to the solenoid proportional valve 15. Additionally, a block 203 outputs an integral coefficient Ki for the integral control operation, a block 205 multiplies the differential pressure deviation Δ(ΔP) by the integral coefficient to determine an increment ΔθΔP of the target tilting position, and a block 206 adds the increment to the swash plate target position θo calculated in the preceding cycle, thereby determining a swash plate target position for the present cycle.

In the above arrangement, a characteristic of the pump regulator 16B is set such that the pump regulator 16B can be operated by the first hydraulic signal generated by the lines 41, 42 which constitute the first signal pressure generating means, i.e., the differential pressure ΔP between the maximum load pressure P1 and the pump delivery pressure Pd, and characteristics of the control unit 13B and the solenoid proportional valve 15 are set such that the working range of the second hydraulic signal Pc generated by the solenoid proportional valve 15 is substantially at the same level as the working range of the differential pressure ΔP.

Specifically, the pump regulator 16B is constructed, as mentioned above, such that the tilting amount of the swash plate 1a is increased when the pressure of the second hydraulic signal Pc is smaller than the set value ΔPs of the spring 18d and, to the contrary, is reduced when the pressure of the second hydraulic signal Pc is larger than the set value ΔPs of the spring 18d. On the other hand, the differential pressure ΔP lowers when the pump delivery rate is smaller than the demanded flow rate, and rises when the pump delivery rate is larger than the demanded flow rate. Accordingly, change in the signal input to the pump regulator 16B (i.e., the second hydraulic signal Pc) when the pump delivery rate is increased and reduced corresponds to change in the differential pressure ΔP when the pump delivery rate is increased and reduced. This means that the structure of the pump regulator 16B permits the differential pressure ΔP to be used in place of the second hydraulic signal Pc if both pressure levels are adjusted to coincide with each other. First, therefore, a characteristic of the spring **18*d* of the control switching valve 18 in the pump regulator 16B is set such that the control switching valve 18 can be operated with the differential pressure ΔP and the pump regulator 16B can exhibit the characteristic shown in FIG. 19 in the working range of the differential pressure ΔP when the fluid temperature in the hydraulic driving system is 50° C. Here, since the differential pressure ΔP is controlled to be coincident with the set value ΔPs of the spring 18*d***, the set value ΔPs provides a target differential pressure for the load sensing control.

Assuming, by way of example, that the unloading valve 38 is set to generate a differential pressure of 0 to 30 $Kg/cm^2$ in the lines 41, 42, a characteristic of the spring **18*d* in the pump regulator 16B is set such that the spring can generate a force corresponding to 20 $Kg/cm^2$ in the initial setting and the pump regulator 16B can exhibit the characteristic shown in FIG. 19** the differential pressure ΔP having the working range of 0 to 30 $Kg/cm^2$.

Next, as stated above, the control unit 13B calculates the target value Pz1 of the second hydraulic signal Pc corresponding to the deviation Z by using the table as shown in the block 208, and then outputs the second electric signal E corresponding to the target value Pz1. The table used in the block 208 is set such that the target value Pz1 of the second hydraulic signal is equal to the set value ΔPs of the spring **18*d* of the control switching valve 18 in the pump regulator 16B (i.e., the target differential pressure ΔPo set in the block 200 at the fluid temperature of 50° C.) when the deviation Z=0 holds, i.e., when there is no difference between the target tilting position θo and the actual tilting position θ, is smaller than the set value ΔPs of the spring 18*d* when Z>0 holds, i.e., when the target tilting position θo is smaller than the actual tilting position θ, and is larger than the set value ΔPs of the spring 18*d* when Z<0 holds, i.e., when the target tilting position θo is larger than the actual tilting position θ. Also, the solenoid proportional valve 15 is set such that the second hydraulic signal Pc output therefrom is equal to the set value ΔPs of the spring 18*d* for Z=0, is smaller than the set value ΔPs of the spring 18*d* for Z>0, and is larger than the set value ΔPs of the spring 18*d* for Z<0. Based on the above setting, the pump regulator 16B holds the tilting position of the swash plate 1*a* for Z=0, increases the tilting amount of the swash plate 1*a* for Z>0, and reduces the tilting amount of the swash plate 1*a* for Z<0 in accordance with the characteristic shown in FIG. 19**.

Thus, the second hydraulic signal Pc generated by the solenoid proportional valve 15 is set to vary about the set value ΔPs of the spring **18*d* (i.e., the target differential pressure ΔPo set in the block 200 at the fluid temperature of 50° C.) and, as stated above, a characteristic of the spring 18*d* is set such that the pump regulator 16B can exhibit the characteristic shown in FIG. 19** in the working range of the differential pressure ΔP when the fluid temperature in the hydraulic driving system is 50° C. Therefore, the working range of the second hydraulic signal Pc is substantially at the same level as in the working range of the differential pressure ΔP.

In the foregoing example, the setting of the table in the block 208 allows the solenoid proportional valve 15 to generate the second hydraulic signal Pc having the working range of 0 to 30 $Kg/cm^2$.

Figure 22:
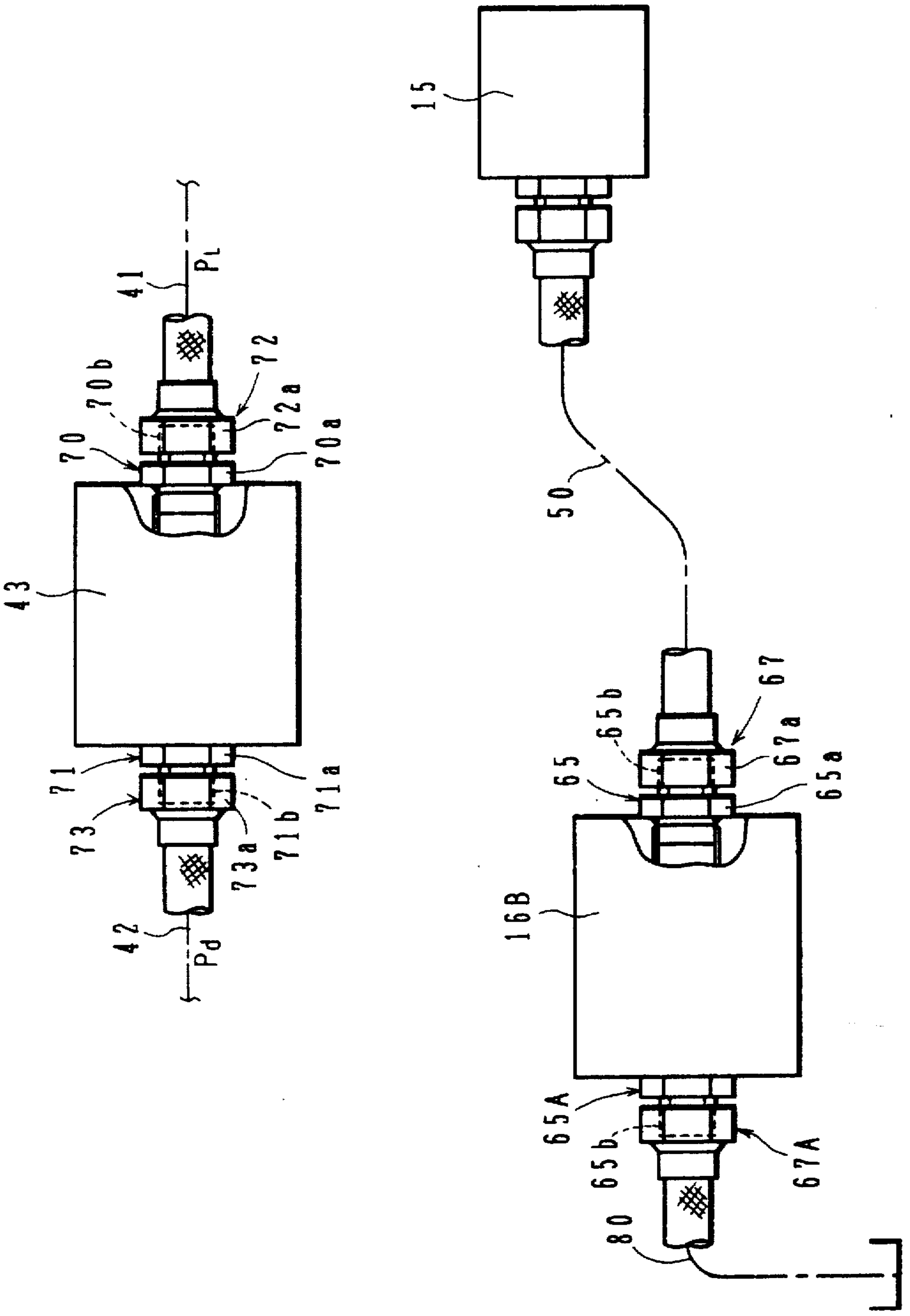
FIG. 22 is a view showing details of line connection portions between a solenoid proportional valve and a regulator. and details of connecting portions between a differential pressure sensor and a differential pressure detecting line.

FIG. 22 shows details of line connecting portions between the solenoid proportional valve 15 and the regulator 16B and details of connecting portions between the differential pressure sensor 43 and the lines 41, 42. Connecting portions between the solenoid proportional valve 15 as well as the regulator 16B and the line 50 are of the same structure as those in the first embodiment shown in FIG. 9. A connecting portion of the regulator 16B to a line 80 on the reservoir side is also constructed in a similar manner. Specifically, an adaptor 65A is attached to the connecting portion of the regulator 16B and a mouthpiece 57A is attached to the end of the line 80 extending to the reservoir, the adaptor 65A and the mouthpiece 57A being screwed to each other.

Meanwhile, adaptors 70, 71 are attached to connecting portions of the differential pressure sensor 43 at which the sensor is connected to the lines 41, 42. As with the adaptor 65 shown in FIG. 9, the adaptors 70, 71 have nut portions **70*a*, 71*a* and insert portions 70*b*, 71*b* provided with male threads. On the other hand, mouthpieces 72, 73 each similar to the mouthpiece 60 shown in FIG. 9 are attached to the corresponding ends of the lines 41, 42. The mouthpieces 72, 73 have openings provided with female threads on the inner side and nut portions 72*a*, 73*a* on the outer side. The mouthpieces 72, 73 are screwed respectively to the adaptors 70, 71 by fitting the openings of the mouthpieces 72, 73 to the insert portions 70*b*, 71*b* of the adaptors 70, 71 and then turning the nut portions 72*a*, 73*a***.

In this embodiment arranged as described above, when the flow control valve 3B is in the neutral position and closed, the differential pressure ΔP is maximized and, therefore, the displacement of the hydraulic pump 1 is reduced to a minimum. As the flow control valve 3B is operated to move farther away from the neutral position and the differential pressure ΔP is reduced, the displacement of the hydraulic pump 1 is increased. The delivery rate of the hydraulic pump 1 is thus controlled in accordance with the demanded flow rate.

Further, as mentioned above referring to FIG. 17, when the fluid temperature in the hydraulic driving system is lower than 50° C., the differential pressure ΔP is increased and when it is higher than 50° C., the differential pressure ΔP is reduced. Therefore, unless the temperature compensation is performed on the differential pressure, the delivery rate of the hydraulic pump 1 cannot be controlled precisely. In this embodiment, since the fluid temperature in the hydraulic driving system is detected and the target differential pressure ΔPo is compensated in the control unit 13B depending on temperature as described above, it is possible to compensate the effect of the fluid temperature in the hydraulic driving system and precisely control the delivery rate of the hydraulic pump 1.

Figure 23:
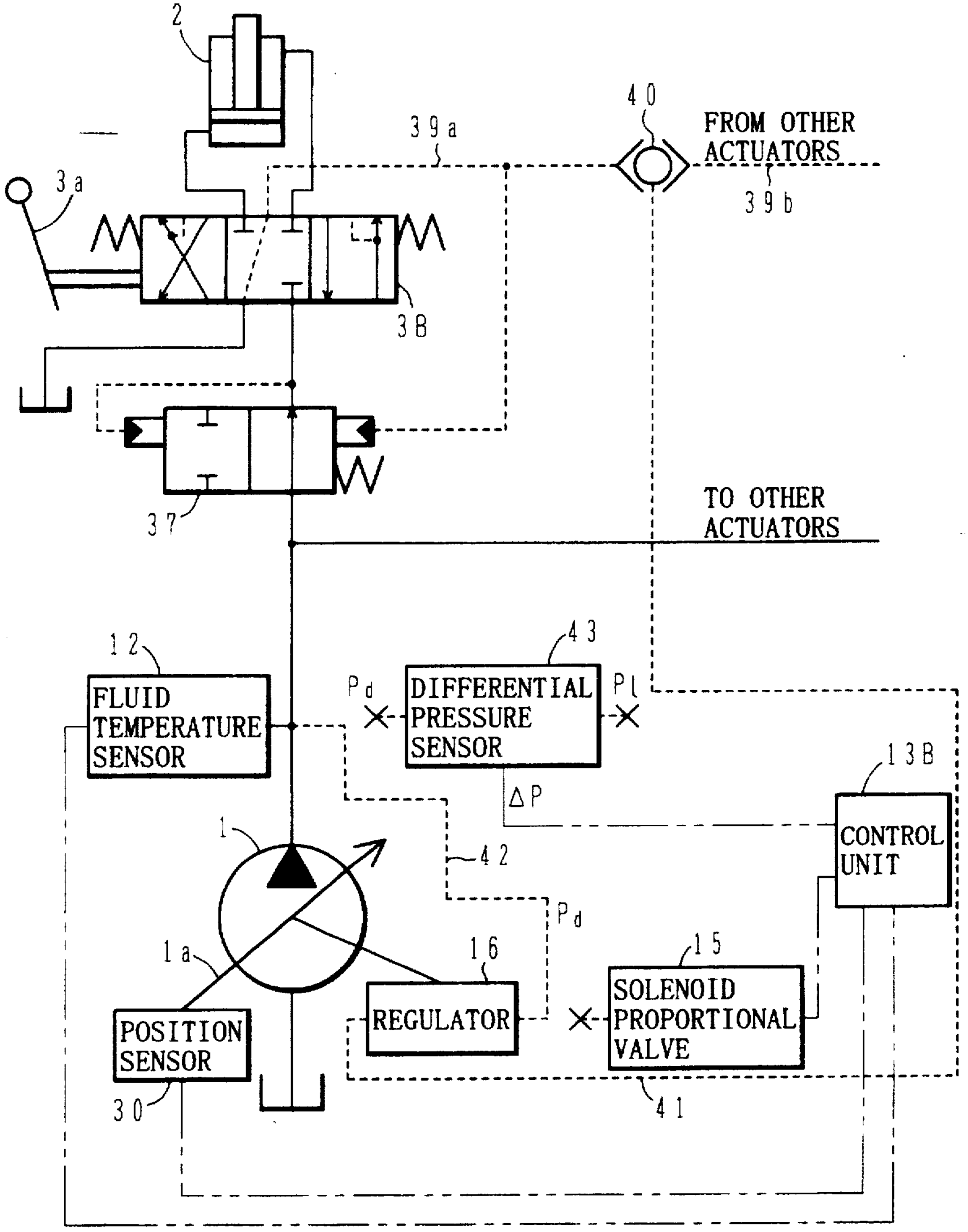
FIG. 23 is a diagram showing a condition where the hydraulic control system shown in FIG. 16 is failed during the operation.
Figure 24:
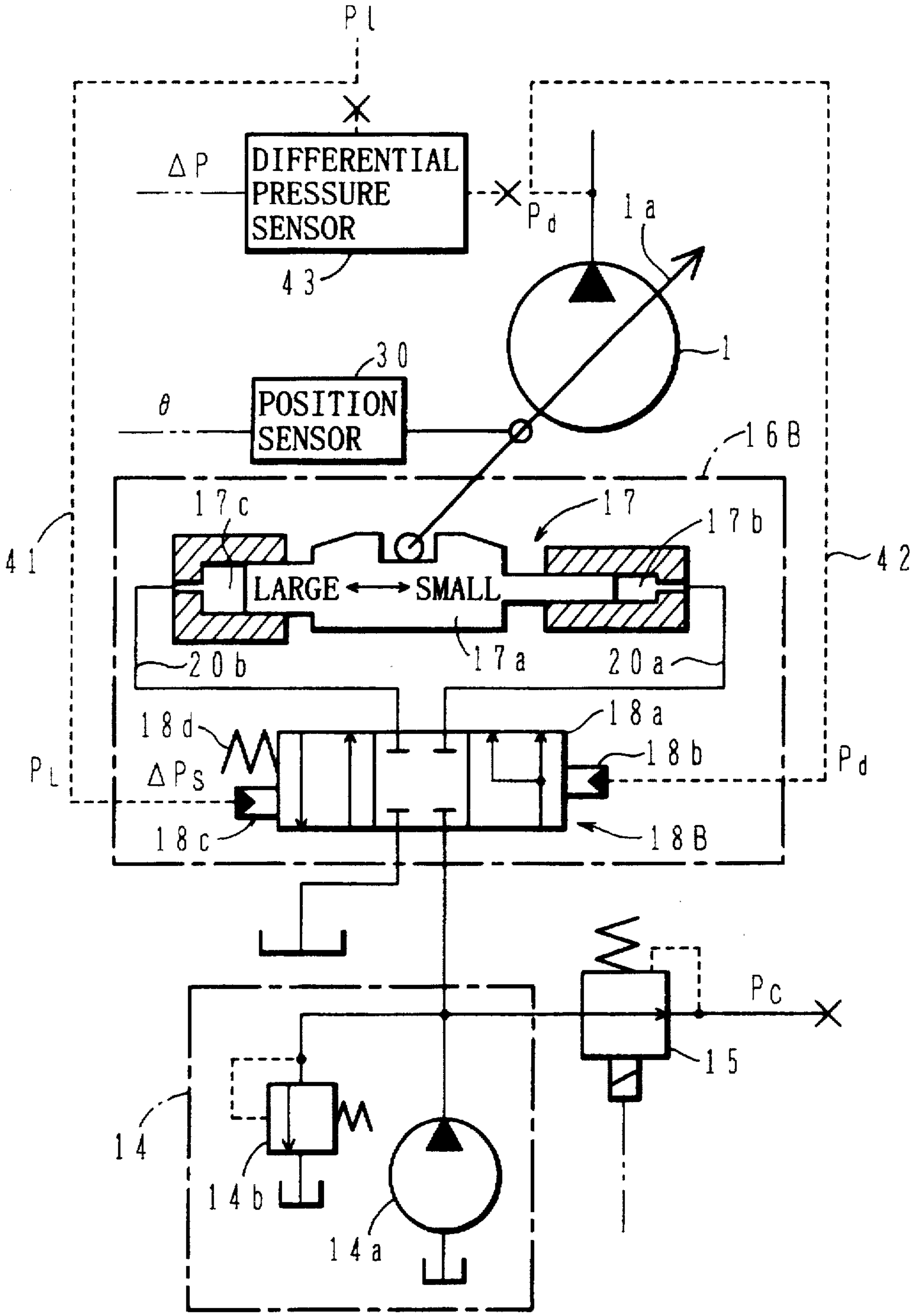
FIG. 24 is a diagram showing a condition where the pump controller shown in FIG. 18 is failed during the operation.

Then, in the event of any trouble in the electric system such as abnormal operation of the differential pressure sensor 43, the control unit 13B and the solenoid proportional valve 15, or a contact failure of wires, the control switching valve 18 of the pump regulator 16B is disconnected from the solenoid proportional valve 15 and the reservoir, the differential pressure sensor 43 is disconnected from the lines 41, 42, the line 41 is connected to the pressure receiving sector **18*c* of the control switching valve 18, and the line 42 is connected to the pressure receiving sector 18*b* of the control switching valve 18, as shown in FIGS. 23 and 24. With this rearrangement, since a characteristic of the pump regulator 16B and characteristics of the control unit 13B and the solenoid proportional valve 15 are set as described above, the pump regulator 16B** can be operated by the differential pressure ΔP in a similar manner as prior to the occurrence of trouble under the fluid temperature condition during general work.

Figure 25:
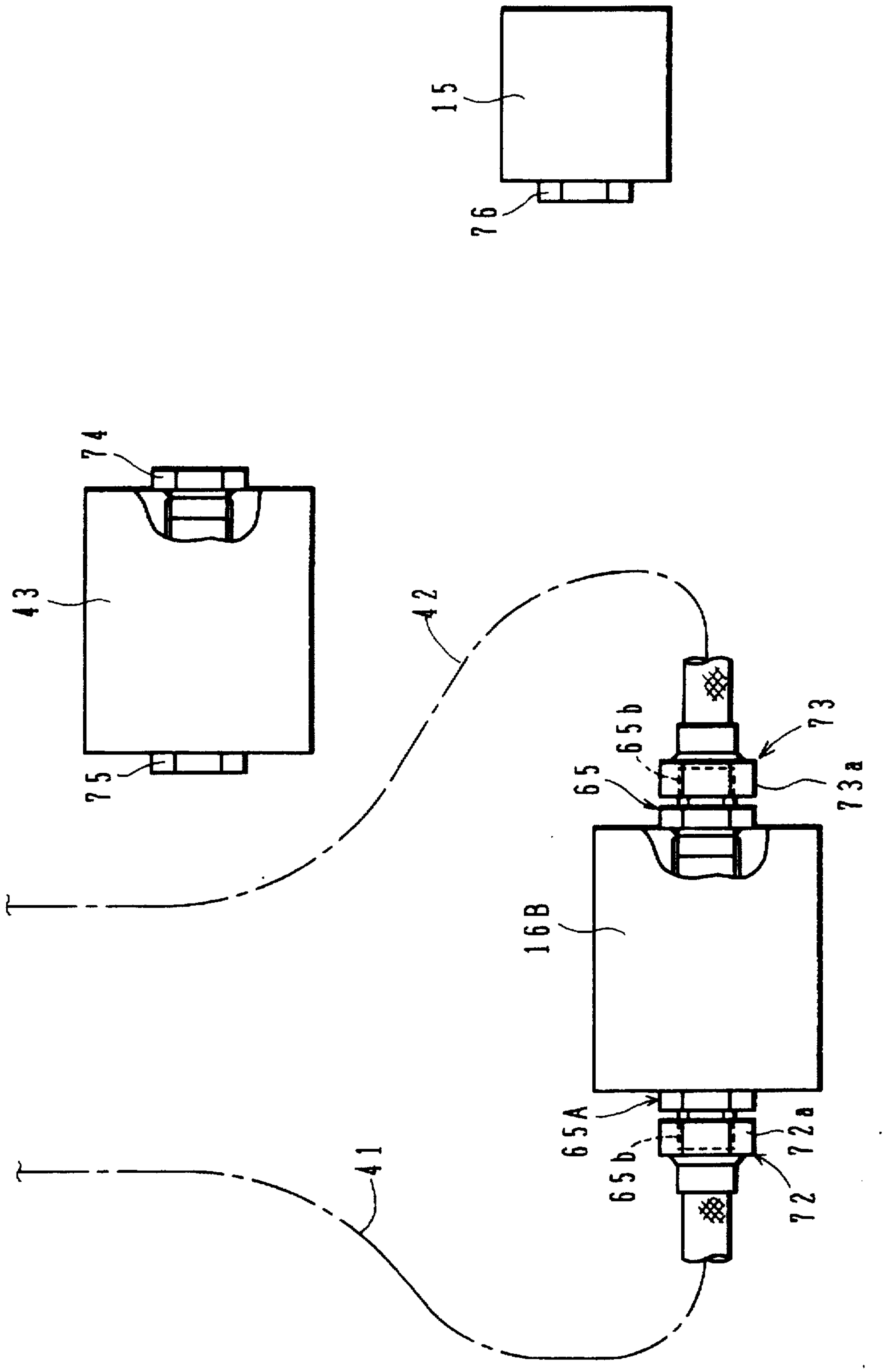
FIG. 25 is a view showing details of connecting portions between the differential pressure detecting line and the regulator.

FIG. 25 shows details of connecting portions between the lines 41, 42 and the regulator 16B. When connecting the lines 41, 42 to the regulator 16B, the mouthpieces 72, 73 of the lines 41, 42 are removed respectively from the adaptors 70, 71 of the differential pressure sensor 43 and the mouthpieces 67, 67A of the lines 50, 80 are removed respectively from the adaptors 65, 65A of the regulator 16B. After that, the mouthpieces 72, 73 of the lines 41, 42 are connected respectively to the adaptors 65, 65A in a like manner to the above embodiment At this time, it is preferable that the adaptors 70, 71 be removed from the differential pressure sensor 43 and the mouthpiece openings of the differential pressure sensor 43 be closed by plugs 74, 75. For the solenoid proportional valve 15 side, rather than closing the mouthpiece 67 of the line 50 by a plug, the mouthpiece opening of the solenoid proportional valve 15 may be closed by a plug 76 after removing the line 50 and the adaptor.

With this embodiment, as described above, when the displacement of the hydraulic pump is controlled in accordance with a status variable of the hydraulic driving system, it is also possible to easily hydraulically back up a trouble caused in the electric system, while employing the control unit to utilize the advantage of electric control, and hence shorten the down time of the machine as compared with the prior art. Further, under the fluid temperature condition during general work, the pump regulator can be operated with almost similar performance as prior to the occurrence of trouble.

In the foregoing embodiment, the negative control pressure (embodiment of FIG. 1) or the differential pressure between the pump delivery pressure and the maximum load pressure (embodiment of FIG. 16) is employed as the pressure (first hydraulic signal) depending on a status variable of the hydraulic driving system. In a hydraulic driving system wherein a pump regulator is driven with a pilot pressure generated by a manipulation device to control the pump delivery rate, however, the as the pressure may be employed as the pressure (first hydraulic signal) depending on a status variable of the hydraulic driving system. In this case, the similar advantages can be also achieved by setting the system in a like manner.

INDUSTRIAL APPLICABILITY

With the present invention, when the displacement of the hydraulic pump is controlled in accordance with a status variable of a hydraulic driving system, it is possible to easily hydraulically back up a trouble caused in an electric system, while employing a control unit to utilize the advantage of electric control, and hence shorten the down time of a machine as compared with the prior art. In addition, under the fluid temperature condition during general work, a pump regulator can be operated with almost similar performance as prior to the occurrence of trouble.

We claim:

1. A hydraulic control system comprising a hydraulic driving system including a variable displacement hydraulic pump, a hydraulic actuator driven by a hydraulic fluid delivered from said hydraulic pump, a flow control valve for controlling a flow of the hydraulic fluid supplied from said hydraulic pump to said hydraulic actuator, and manipulation means for operating said flow control valve; first signal pressure generating means for generating, as a first hydraulic signal, a pressure depending on a status variable of said hydraulic driving system; and a pump controller including pressure detecting means for detecting the first hydraulic signal generated by said first signal pressure generating means and converting the detected first hydraulic signal into a first electric signal, a control unit for receiving the first electric signal from said pressure detecting means, executing certain arithmetic operation and outputting a second electric signal, and a pump regulator driven in accordance with the second electric signal from said control unit for controlling the displacement of said hydraulic pump;

wherein said pump controller further includes second signal pressure generating means for generating a second hydraulic signal depending on the second electric signal from said control unit and driving said pump regulator hydraulic signals;

wherein said pump regulator comprises an actuator for operating a displacement varying mechanism of said hydraulic pump and a control switching valve for controlling the operation of said actuator, and said control switching valve comprises a control spool, a pressure receiving sector provided at one end of said control spool for receiving said second hydraulic signal, and biasing means provided at the other end of said control spool opposite to said pressure receiving sector, a characteristic of said biasing means being set such that said control switching valve can be operated by the first hydraulic signal generated by said first signal pressure generating means and said pump regulator can operate said displacement varying mechanism of said hydraulic pump in the working range of said first hydraulic signal whereby a characteristic of said pump regulator is set such that said pump regulator can be operated by the first hydraulic signal generated by said first signal pressure generating means; and wherein said control unit calculates, based on the first electric signal from said pressure detecting means, a value adapted for making the working range of the second hydraulic signal generated by said second signal pressure generating means substantially at the same level as the working range of the first hydraulic signal generated by said first signal pressure generating means, and determines said second electric signal with said value being as a target value of the second hydraulic signal generated by said second signal pressure generating means, followed by outputting to said second signal pressure generating means whereby characteristics of said control unit and said second signal pressure generating means are set such that the working range of the second hydraulic signal generated by said second signal pressure generating means is substantially at the same level as the working range of the first hydraulic signal generated by said first signal pressure generating means.

2. A hydraulic control system according to claim 1, wherein said pump controller further includes auxiliary line extended from a branching portion between said second signal pressure generating means and said pressure detecting means to a position near said pump regulator for introducing said first hydraulic signal therethrough.

3. A hydraulic control system according to claim 1, wherein said pump control means further includes abnormality detecting means for detecting the occurrence of abnormality in any of said pressure detecting means, said control unit and said second signal pressure generating means, and switching means supplied with said first and second hydraulic signals for selecting said second hydraulic signal to act on said pump regulator when no abnormality is detected by said abnormality detecting means, and selecting said first hydraulic signal to act on said pump regulator when any abnormality is detected by said abnormality detecting means.

4. A hydraulic control system according to claim 3, wherein said abnormality detecting means includes means for detecting a displacement of said hydraulic pump, and means for comparing a target displacement calculated by said control unit with the displacement detected by said detecting means and determining the occurrence of abnormality from the compared result.

5. A hydraulic control system according to claim 1, wherein said first signal pressure generating means includes flow resisting means for generating, as said first hydraulic signal, a negative control pressure depending on a center bypassing flow rate in said hydraulic driving system.

6. A hydraulic control system according to claim 1, wherein said first signal pressure generating means includes a line for introducing a delivery pressure of said hydraulic pump therethrough and a line for introducing a maximum load pressure in said hydraulic driving system therethrough, and a differential pressure the maximum load pressure in said hydraulic driving system is detected as said first hydraulic signal through said both lines.

7. A hydraulic control system according to claim 1, wherein said second signal pressure generating means is a solenoid proportional valve.

* * * * *

UNITED STATES PATENT AND TRADEMARK OFFICE

CERTIFICATE OF CORRECTION

PATENT NO. : 5,758,499

DATED : June 2, 1998

INVENTOR(S) : G. SUGIYAMA et al

It is certified that error appears in the above-indentified patent and that said Letters Patent is hereby corrected as shown below:

On title page of the patent, please change "(22) PCT Filed: Jan. 3, 1996" to --(22) PCT Filed: March 1, 1996--.

Signed and Sealed this

Third Day of November, 1998

Attest:

Bruce Lehman

BRUCE LEHMAN

*Attesting Officer*

*Commissioner of Patents and Trademarks*